(12) United States Patent
Bailey et al.

(10) Patent No.: US 7,061,484 B2
(45) Date of Patent: Jun. 13, 2006

(54) USER-INTERFACE AND METHOD FOR CURVED MULTI-PLANAR REFORMATTING OF THREE-DIMENSIONAL VOLUME DATA SETS

(75) Inventors: Anthony Bailey, Edinburgh (GB); Matthew Barish, Southborough, MA (US)

(73) Assignee: Voxar Limited, Edinburgh (GB)

( * ) Notice: Subject to any disclaimer, the term of this patent is extended or adjusted under 35 U.S.C. 154(b) by 63 days.

(21) Appl. No.: 10/507,021

(22) PCT Filed: Sep. 16, 2003

(86) PCT No.: PCT/GB03/03997

§ 371 (c)(1),
(2), (4) Date: Sep. 8, 2004

(87) PCT Pub. No.: WO2004/049265

PCT Pub. Date: Jun. 10, 2004

(65) Prior Publication Data

US 2005/0122343 A1    Jun. 9, 2005

(30) Foreign Application Priority Data

Nov. 27, 2002   (GB)   ................................. 0227667.3

(51) Int. Cl.
*G06T 17/00* (2006.01)
(52) U.S. Cl. ...................................................... 345/419
(58) Field of Classification Search ................ 345/419, 345/420, 424
See application file for complete search history.

(56) References Cited

U.S. PATENT DOCUMENTS 5,986,662 A    11/1999  Argiro et al. ................ 345/424
6,606,090 B1*  8/2003   Shimamura ................. 345/419

FOREIGN PATENT DOCUMENTS

| EP | 1 069 533  | 1/2001  |
|----|------------|---------|
| JP | 2001101449 | 9/1999  |
| JP | 2001118015 | 10/1999 |
| WO | 02/43007   | 5/2002  |

OTHER PUBLICATIONS

Vilanova, A. et al. "VirEn: A Virtual Endoscopy System." *Machine Grpahics & Vision*. 8.3 (1999): 469-487.

(Continued)

*Primary Examiner*—Almis R. Jankus
(74) *Attorney, Agent, or Firm*—Renner, Otto, Boisselle & Sklar, LLP

(57) ABSTRACT

A user interface for a computer-implemented Multi-Planar Reformatting (MPR) system comprises three display areas in which are displayed three orthogonal MPR images of the volume data set; a curve drawing tool to allow a user to define a curve through the volume data set; six selectable icons each representing one of six possible combinations of a plane parallel to one of the orthogonal MPR images and a direction substantially normal to a plane parallel to one of the other two MPR images, using which the user selects an approximate direction for the curve; and a fourth display area displaying a curve-related MPR image related to one or more points along the curve. The icons may be individually selectable to allow user input of adequate orientational information for a curved MPR image, or selectable in pairs for input of directional information for a cross-curve MPR image. Alternatively, three icons may be provided for a cross-curve MPR system. A tool to allow rotation of a curved MPR image about the curve can be provided, as can visual indicators of the depth of the curve within the volume, and of the orientation of the cross-curve image.

50 Claims, 12 Drawing Sheets

OTHER PUBLICATIONS

Lee, J. et al. "User-friendly Environemnt for Virtual Endscopy." *Proceedings of the 5th Korea-Germany Joint Workshop on Advanced Medical Image Processing*. May 2001.

Kanitsar, A. et al. "CPR—Curved Planar Reformation." *IEEE Visualization 2002*. (2001): 37-44.

* cited by examiner

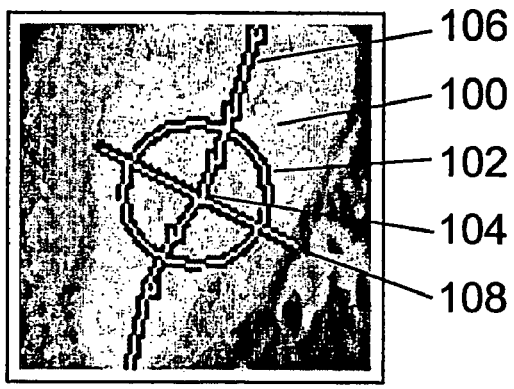 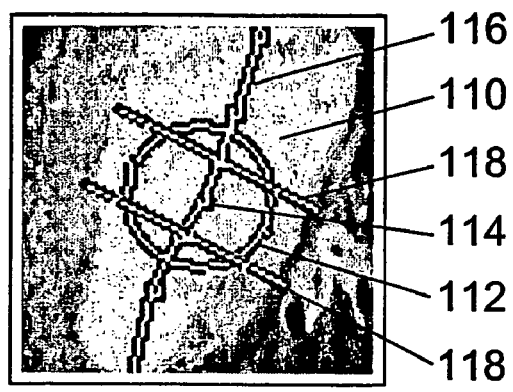
Fig. 11a  Fig. 11b
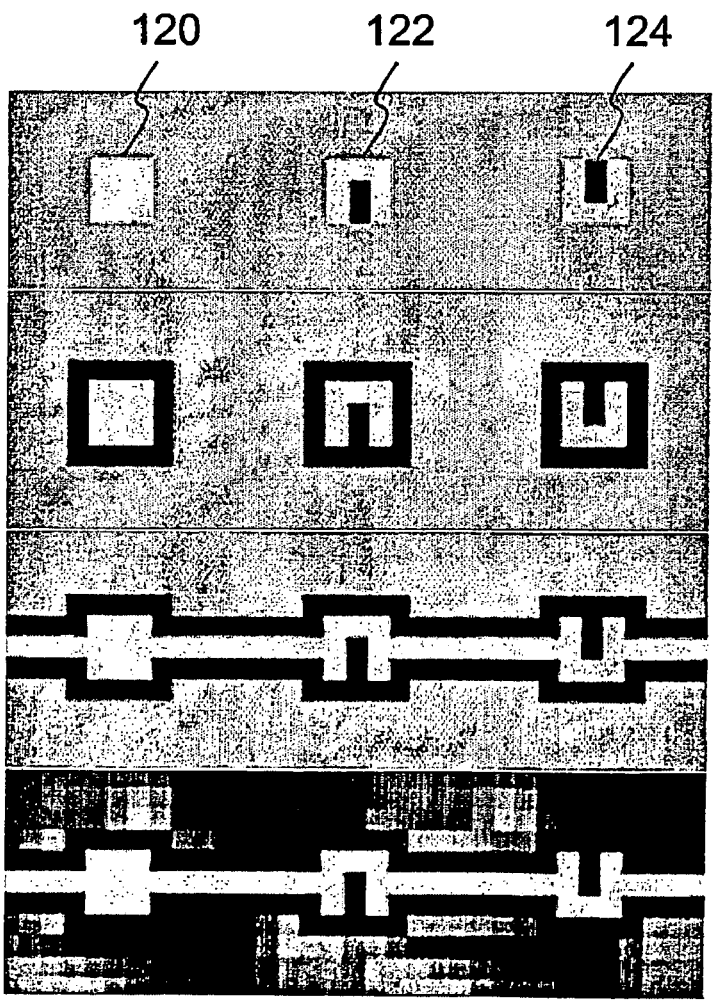
Fig. 12a
Fig. 12b
Fig. 12c
Fig. 12d

USER-INTERFACE AND METHOD FOR CURVED MULTI-PLANAR REFORMATTING OF THREE-DIMENSIONAL VOLUME DATA SETS

This application is a national phase of International Application No. PCT/GB2003/003997 filed Sep. 16, 2003 and published in the English language.

BACKGROUND OF THE INVENTION

The present invention relates to curved multi-planar reformatting of three-dimensional volume data sets, particularly volume data sets representing patient images, and user interfaces for computer-implemented curved multi-planar reformatting systems.

Modern patient imaging methods, such as computed tomography (CT) and magnetic resonance imaging (MRI), generate large three-dimensional volume data sets representing the patient's body. These volume data sets are highly detailed and allow complex studies of the body to be made. However, a typical volume data set will contain details of many body parts which are not relevant for a particular study, or which obscure important features. Data processing methods are hence used to manipulate the data set and present a viewer with an image which shows the items of interest in a useful and meaningful manner.

The images are of necessity two-dimensional renderings of parts of the three-dimensional data set. They may take the form of planar slices through the volume. However, the anatomical feature of interest is almost always non-planar, so cannot be shown fully in a single slice. For example, a surgeon may wish to study an artery along its entire length. The artery will follow a complex path in three-dimensions, so that any slice through the volume around the artery will only show part of it. The same problem arises for other curved anatomical structures, such as bronchi, the colon, the spine, and dental structures. Various data processing techniques have been developed to address this issue. Vilanova et al [1] describe a virtual endoscopy method to visualise tubular curved structures, which uses algorithms to calculate the path of a central axis of the structure from the data set. This axis is then used as a camera path for a virtual endoscopic camera.

An alternative approach for viewing curved structures is a computer-implemented technique known as curved Multi-Planar Reformatting (MPR), or Curved Planar Reformatting (CPR). This is a computer-implemented method in which a curve of interest is defined through the volume data set, for example along the central axis of an artery. Data processing is then used to calculate the co-ordinates of a curved sheet which follows the bends of the curve. The curve is thus wholly contained within the plane of this sheet. The sheet is flattened out and presented to the user as a two-dimensional image showing the entire path of the curve, in this case, a longitudinal cross-section through the artery.

Curved MPR is a complex spatial technique. To obtain useful images, it is necessary to define coordinate systems or specify directions within the volume data set with respect to which the curve and the curved sheet can be oriented. One way of achieving this is to obtain some criteria from the user, and allow the software to make assumptions regarding other criteria. This makes for simple software, and increased ease of use for the user, because user input is minimised. However, in some circumstances, the assumptions made may be inaccurate or wholly incorrect. This can occur for example if ambiguities are present in the data set so that two or more assumptions appear equally valid. If the user recognises from the final curved MPR image that this has happened, he will have to repeat the imaging process, perhaps using different input criteria to avoid the ambiguity. This is clearly undesirable. Worse, though, is that there may be instances when the user fails to identify any problem. This can lead to erroneous clinical decisions being made, which puts patients at risk.

One prior art system [2, 3, 4] initially presents the user with three orthogonal views through the volume data set, each bearing a cross-hair. Selection by the user of one of the cross-hairs defines a general direction of the curve through the volume, while the underlying view defines a direction from which the user desires to view the resulting curved image. Once the selection is made, the two non-selected images are replaced by a curved MPR image. The user draws the curve on the remaining, selected image. This is limiting, in that if the curve is particularly tortuous, the user is unable to place curve points in the centre of the curve path, so that the resulting curve and curved MPR image may not accurately reflect the user's desired view. The two non-selected images are also no longer available to use as references to determine curve orientation when the user becomes disoriented.

An alternative system [5] retains all three orthogonal views while the curved MPR image is displayed. The curve is shown in each of the views, and can be edited by manipulation of movable points. However, the user has only minimal control of a chosen curved sheet, and therefore can be easily confused about the orientation of the curve.

Thus there is a need for an improved curved MPR system.

SUMMARY OF THE INVENTION

Accordingly, a first aspect of the present invention is directed to a user interface for a computer-implemented Multi-Planar Reformatting (MPR) system for allowing a user to define and view a curve through a three-dimensional volume data set, comprising:

first, second and third display areas in which are displayed three orthogonal MPR images of the volume data set;

a curve drawing tool to allow a user to define a curve through the volume data set, at least part of the curve being displayed in projected format on each of the MPR images;

a plurality of selectable icons each representing a direction substantially normal to a plane parallel to one of the MPR images, using which the user can select an approximate direction to be taken by the curve through the volume data set; and a fourth display area, in which is displayed, after the user has defined at least part of the curve, a curve-related MPR image through the volume data set related to one or more positions along the curve.

This combination of features provides an efficient and straightforward user interface for a curve-related MPR system, which gives the user effective access to powerful curved MPR techniques without the need for understanding of the complex underlying spatial and numerical concepts involved in curve-related MPR processes. The interface allows curve-related MPR to be used in a highly flexible manner, because the user has a high level of input relating to the geometry and orientation of the images and the positioning of the curve. The icons allow the user to completely specify the orientation of the curve, so that subsequent image processing and display is performed in the appropriate geometrical context. Also, the provision of three standard orthogonal MPR images at all times allows the user to define the curve in three dimensions with great precision. It enables the user to reshape the curve after definition if the resulting MPR image requires modification, or to compare one or more MPR views. These features remove the requirement for any assumptions to be made in the calculation, derivation and display of the MPR image. Thus the displayed image accurately reflects those anatomical features in the correct orientation that the user desires to observe. Moreover, the user can be confident that this is the case, because he has input all the variables, and knows that no assumptions are being made. Thus a precise and accurate medical opinion can be reached on the basis of the displayed image. This results in improved patient treatment, because medical complaints can be treated appropriately and effectively. Health care costs can also be reduced, because better patient treatment results in faster recovery times and reduced rate of readmission to hospital. This is in contrast with previous MPR systems in which user input is less and assumptions are necessary, which can generate confusing images with orientations which are difficult to determine. In some cases, it may not be apparent to the user that the image is not the desired image, so that diagnostic and/or treatment decisions are made without the knowledge that a margin of error should be included.

Advantageously, the plurality of selectable icons are displayed in the fourth display area before the user begins to define the curve, and removed from the fourth display area and replaced with the curve-related MPR image after the user has defined at least part of the curve. This makes a good use of the space available on the user interface, and allows the curve-related MPR image to be displayed on a large scale, while still retaining the standard orthogonal images at all times.

In a preferred embodiment, each icon comprises an image representing one of the orthogonal MPR images overlain with a generic indicator of a direction to be taken by the curve which is substantially orthogonal to one of the other two orthogonal MPR images. The generic indicator may comprise a curved line and a representation of curvature of the orthogonal MPR image. Simple pictorial icons of this type are useful to the user because they allow basic visualisation of the curve in the appropriate context, so that the correct selection of orientation and direction can be readily made. Also, the interface is made accessible to users regardless of language skills.

The image comprised in each icon may be a thumbnail version of the relevant orthogonal MPR image. This arrangement allows a high level of visualisation to be made, and may assist in making an appropriate choice of curve direction in the event that more than one direction is potentially suitable.

Alternatively, the image comprised in each icon may be a generic representation of the relevant orthogonal MPR image. Generic images allow the same images, or a small set of images, to be used for all anatomical subject matter, regardless of the anatomical feature of interest. This can increase user familiarity with the interface, and may also reduce processing requirements, because there is no need to reduce the complex MPR images to a small size. The generic representation of the relevant orthogonal MPR image may be selected from a group of generic representations according to user input or tags associated with the three-dimensional volume data set. This provides a way of showing generic representations which are linked to the anatomical features of interest, thus assisting the user to visualise the curve without the processing power needed to handle the actual MPR images.

In one embodiment, the plurality of selectable icons comprises six icons each representing one of six possible combinations of a plane parallel to one of the orthogonal MPR images and a direction substantially normal to a plane parallel to one of the other two MPR images, the six icons being individually selectable to allow the user to select both a direction to be taken by the curve, and a plane parallel to one of the MPR images. In this case, the curve-related MPR image shown in the fourth display area may be a curved MPR image having a view direction substantially normal to the selected plane. Six separate icons bearing this information covers every combination of pairs of orthogonal directions, so allows the user full, simple and intuitive access to every possible curve orientation which can be specified for curved MPR images.

In an alternative embodiment, the plurality of selectable icons comprises six icons each representing one of six possible combinations of a plane parallel to one of the orthogonal MPR images and a direction substantially normal to a plane parallel to one of the other two MPR images, the six icons being grouped in selectable pairs, each pair having a common direction to be taken by the curve, to allow the user to select a direction to be taken by the curve. In this case, the curve-related MPR image shown in the fourth display area may be a cross-curve MPR image showing an image perpendicular to the curve at a selected position. Once again, the icons are a simple way of specifying the desired orientation. Although a choice of one from three directions is all that is required for cross-curve MPR, the use of six icons as coupled pairs allows the same icons and icon configuration to be used for both the cross-curve and the curved embodiments. This simplifies the interface as regards data and processing requirements, and also increases ease of use because the user only has to become familiar with one interface to be able to use both MPR techniques.

In addition, after the curve has been defined, the selected pair of icons can be redisplayed in the fourth display area as individually selectable icons to allow the user to select a plane parallel to one of the MPR images, and after selection the fourth display area shows a curved MPR image having a view direction substantially normal to the selected plane. This configuration gives great flexibility to the MPR process, because the user can readily specify the extra information needed for curved MPR, and view both curved and cross-curve MPR images from a single curve, without the need to re-implement the MPR process or redefine the curve.

In a further alternative embodiment, the plurality of selectable icons comprises three icons each representing one of three directions, each direction being substantially normal to a plane parallel to one of the MPR images, the three icons being individually selectable to allow the user to select a direction to be taken by the curve. In this case, the curve-related MPR image shown in the fourth display area may be a cross-curve MPR image showing an image perpendicular to the curve at a selected position. Thus, the icon arrangement is limited to just one icon for each of the three available choices for cross-curve MPR. This makes for a simple interface, and reduces the chance of a user becoming confused between curved MPR and cross-curve MPR, by equating the number of icons with the number of available choices.

To provide the flexibility of combining curved MPR with cross-curve MPR available from the previous embodiment, in this instance, after the curve has been defined, two icons can be displayed in the fourth display area, each icon representing one of the two planes parallel one of the orthogonal MPR images and orthogonal to the plane normal to the selected direction, the icons being individually selectable to allow the user to select a plane parallel to one of the MPR images, and after selection the fourth display area shows a curved MPR image having a view direction substantially normal to the selected plane. Thus after implementing cross-curve MPR, the user can move onto curved MPR by choosing one of two possible view directions.

In an advantageous embodiment for displaying a curved MPR image, the orthogonal MPR image which is substantially normal to the selected direction of the curve further shows a manipulatable tool which can be manipulated by the user to control rotation of the view direction about the curve. Rotation of the curved MPR image is of great use, because the user is not limited to his initial choice of viewing direction, and can in effect make observations all around the line of the curve. Provision of a manipulatable tool permits the user to move directly from one view to another view in a straightforward manner. The manipulatable tool comprises one or more arcs along which the view direction can be moved. This is a useful style of tool, as it provides the user with a good visual indicator of the effect of any rotation.

The manipulatable tool may further comprise one or more lines or arrows indicating the current view direction. In this way, the user is provided with a permanent visual indication of the viewing direction.

Rotation of the view direction can be arranged such that it causes the curved MPR image displayed in the fourth display area to be updated such that the curved MPR image is orientated according to a clinical standard. Simple rotation through 360° can be useful for some applications. However, in the case of symmetric body parts, it can cause confusion because it is not immediately apparent from the image which of two opposite directions is the current view direction. Thus, the MPR image can be inverted or flipped before display so that, for example, the right side of the image always corresponds with the left side of the patient, according to standard practices in radiology.

Preferably, the two orthogonal MPR images which are substantially parallel to the selected direction of the curve show all of the curve in projected format. The user is thus provided with a clear indication of the shape of the curve at a high level of detail.

Advantageously, the orthogonal MPR image which is substantially normal to the selected direction of the curve shows a part of the curve in projected format, comprising portions of the curve lying within a predetermined thickness of the volume data set. In the case of the parallel MPR planes, a full projection of the curve is useful. However, full projection on the normal plane is projection of the entire curve back along its length, which tends to produce many overlapping and clustered points. This is typically unhelpful and confusing for the user, and does not assist in visualisation of the curve. Also, large amounts of the MPR image can be obscured. By limiting the projected curve to a short portion to remove extraneous information, these problems are addressed.

In one embodiment, the projected format of the curves comprises a plurality of graphic markers marking points along the curve, and line segments connecting the graphic markers of adjacent points. The markers clearly show the user where the points have been positioned, and may be movable and deletable to allow the user to redefine the curve, so that the curve can be readily edited or otherwise adjusted. The markers can be given differing appearances to indicate various characteristics of the curve. For example, the graphic markers may have different designs to indicate the distance through the volume data set of the positioned points from the plane of the orthogonal MPR image.

A second aspect of the present invention is directed to a computer program product carrying machine-readable instructions for implementing a Multi-Planar Reformatting (MPR) system, the system having a user interface as described in accordance with the first aspect of the invention.

A third aspect of the present invention is directed to a computer system comprising:

a Picture Archiving and Communication System having memory for storing three-dimensional volume data sets;

image processing software operable to perform Multi-Planar Reformatting image processing on the volume data sets and having a user interface according to the first aspect of the present invention; and one or more workstations operable to access the memory and retrieve the three-dimensional volume data sets, and implement the image processing software.

Picture Archiving and Communication Systems (PACS) are being widely introduced into hospitals at the present time, as a convenient way of storing and accessing patient images. MPR can be performed on any image which is stored as a three-dimensional volume data set, so it is advantageous to provide the user interface of the present invention for with an MPR system which is used in conjunction with a PACS arrangement.

A fourth aspect of the present invention is directed to a method of presenting a computer-implemented Multi-Planar Reformatting (MPR) system to a user, the system operable to allow a user to define and view a curve through a three-dimensional volume data set, the method comprising:

displaying three orthogonal MPR images of the volume data set in first, second and third display areas;

displaying a plurality of selectable icons each representing a direction substantially normal to a plane parallel to one of the MPR images;

allowing a user to select an approximate direction to be taken by the curve through the volume data set by selecting one or more of the icons;

allowing a user to define a curve through the volume data set;

displaying at least part of the curve in projected format on each of the MPR images;

deriving a curve-related MPR image through the volume data set related to one or more positions along the curve; and displaying the curve-related MPR image in the fourth display area.

BRIEF DESCRIPTION OF THE DRAWINGS

For a better understanding of the invention and to show how the same may be carried into effect reference is now made by way of example to the accompanying drawings in which:

FIG. 7(*b*) shows a screen shot of a third embodiment of a user interface according to the present invention;

FIGS. 11(*a*) and 11(*b*) show examples of a visual indicator symbol for cross-curve MPR displayed according to a further embodiment of the invention;

FIGS. 12(*a*) to 12(*d*) show examples of graphic markers used to display projected curves according to a further embodiment of the invention.

DETAILED DESCRIPTION

Theoretical Background

Figure 1:
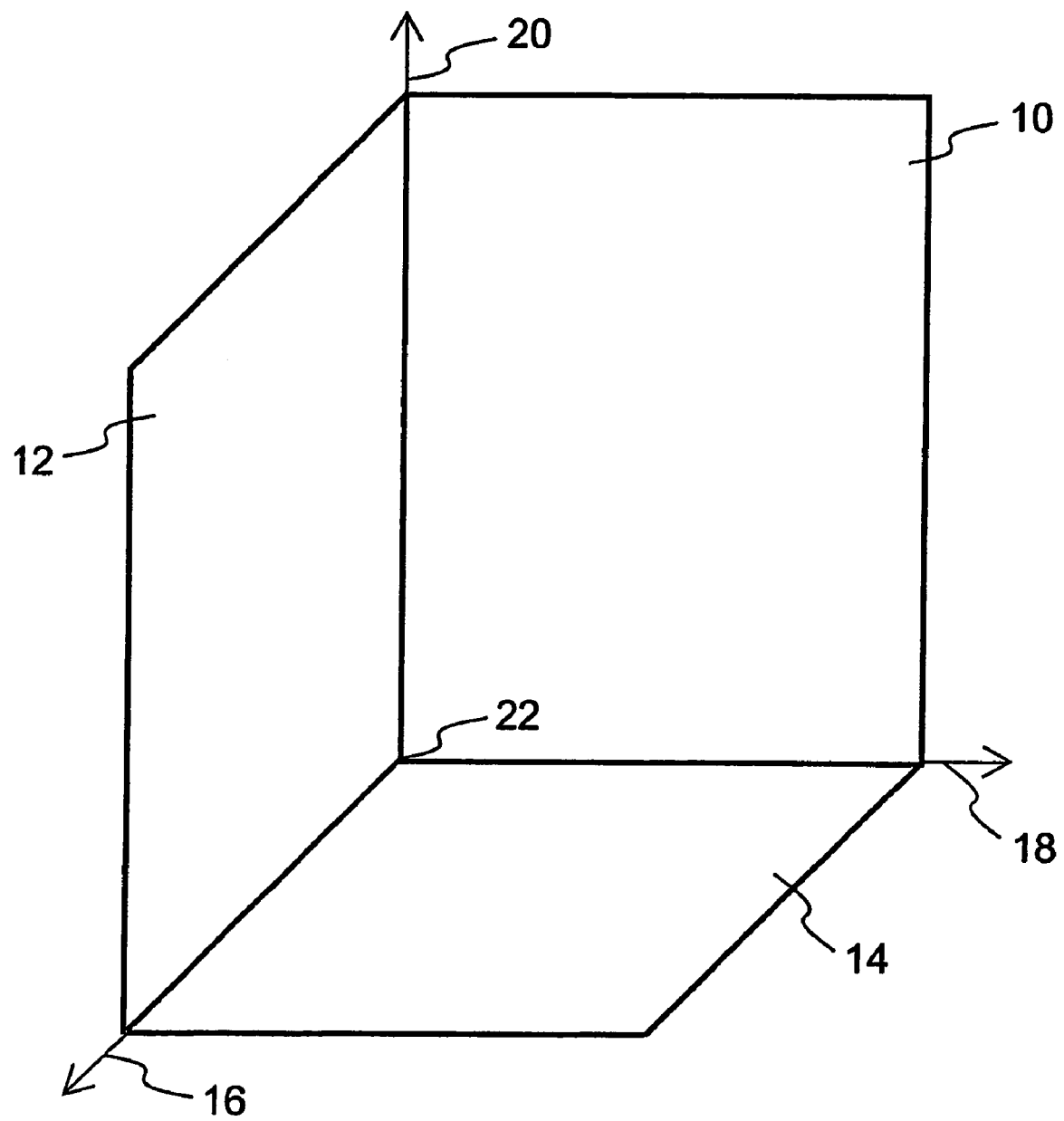
FIG. 1 shows a schematic representation of three orthogonal planes defined within a three-dimensional volume data set.

Curved Multi-Planar Reformatting (curved MPR), also known as Curved Planar Reformatting (CPR), is an established computer-implemented technique for viewing image data obtained from medical imaging techniques such as computed tomography (CT) and magnetic resonance imaging (MRI). These imaging methods produce three-dimensional volume data sets describing all or part of patient's body. Image processing is then required to present to a viewer a usable view of organs of interest within the body.

Multi-Planar Reformatting (MPR) is a technique for presenting planar cross-sectional views through the body. Medical imaging data is normally obtained in a series of slices, either in parallel planes along one axis for modalities such as MRI and CT, or in a sweeping arc for modalities such as ultrasound. In some cases, images can also be obtained as volumes or voxelated data. Once a stack of slices or other volume is collected, multi-planar reformatting can be performed to allow the viewing of the data in any planar or curved orientation. The process involves interpolation of data to remove stepping artifact and create a smooth image in a chosen direction. In the following description, an MPR view, image or plane which is not described as being curved is to be understood as being a flat planar entity. Curved MPR is more complex, and allows curved planes to be defined within the data set and then viewed as a two-dimensional image. This allows, for example, curved, non-planar anatomical structures such as blood vessels or the colon, which cannot be fully seen in a single planar slice through the data set, to be viewed in a meaningful manner. To generate the curved view, a three-dimensional curve which follows the structure of interest is defined through the volume data set representing the patient's body. The curved MPR image or view is then generated by extruding the curve in a particular direction to produce a curtain-like sheet in the three-dimensional volume, and then flattening the sheet and presenting it as a two-dimensional image. Further views, known as cross-curve MPR views can be presented once the curve has been defined; these views are planar cross-sections through the data set which are perpendicular to the curve at a selected point.

A general description of curved MPR will now be given, before various embodiments of the present invention are described. A more detailed discussion of various curved MPR techniques can be found Kanitsar et al [6].

It is convenient to introduce some concepts and associated terminology in terms of which the details of working with curves to generate curved MPR views can be described.

The Curve

The curve is a polyline through the data set of the patient, represented by a sequence of points, each of which can be anywhere in the three-dimensional data volume. The points are joined by straight line segments to produce the curve.

Note that in particular the points do not need to be co-planar, so no MPR plane through the volume necessarily contains the curve. However, the curve and its points can be projected onto one or more MPR planes to enable the curve to be displayed to a user relative to views aligned with those MPR planes. Before projection, the curve and control points may actually be above and/or below (or in front and/or behind) the MPR plane in question.

The curve has a length in the object, which is the sum of the lengths of its straight line segments. The length of a projected curve cannot be longer than the length of the actual curve, and it will be shorter unless the curve happens to be coplanar and parallel to the plane onto which it is projected. In the case of a curve following a tubular anatomical structure, this is unlikely.

The Primary Direction of a Curve and the Tracking View

To define the curve, and subsequently generate a curved MPR view, it is necessary to define some orientation within the data set. It is convenient to use the standard anatomical planes and axes, and in the present invention, this frame of reference is used as a default option. (However, in some embodiments, it may be desirable to allow the user to redefine the frame of reference by using alternative planes). Three orthogonal MPR planes are therefore defined within the data volume, and parallel to the anatomical planes. These are the sagittal plane, which is a vertical plane running from the front to back of the body, the coronal plane, a vertical plane running from the right to left of the body, and the transverse or axial plane, a horizontal plane. The sagittal, coronal and transverse axes are respectively the axes normal to these planes.

FIG. 1 shows a schematic diagram of a volume space having three orthogonal MPR planes defined according to this default. The coronal plane 10, the sagittal plane 12 and the transverse plane 14 each have a respective normal axis, the coronal axis 16, the sagittal axis 18 and the transverse axis 20. The planes and axes are not limited in extent, as shown, but extend throughout the volume of the data set. The origin 22 is the point at which all three planes intersect, and for the purposes of imaging processing can typically be defined to be any point within the volume. Each of the planes can be displayed to a user if desired, depending on the image processing being performed. To give more flexibility, the technique of "cineing" is typically provided, which allows a user to move, or scroll, any of the planes through the volume in a step-wise manner to see a series of parallel sections through the patient, as intersected by the plane in question.

Once the frame of reference is defined, the curve can be defined through the space. This is typically done by providing a curve drawing tool for the user as part of the image processing software, which allows the user to position the points of the curve as desired, with reference to one or more displayed MPR images. This will be discussed in more detail later. Alternatively, image processing techniques can be used to define the curve, for example, by searching for adjacent voxels within the data set which have a value characteristic of the anatomical structure of interest and creating a three-dimensional skeleton.

Figure 2:
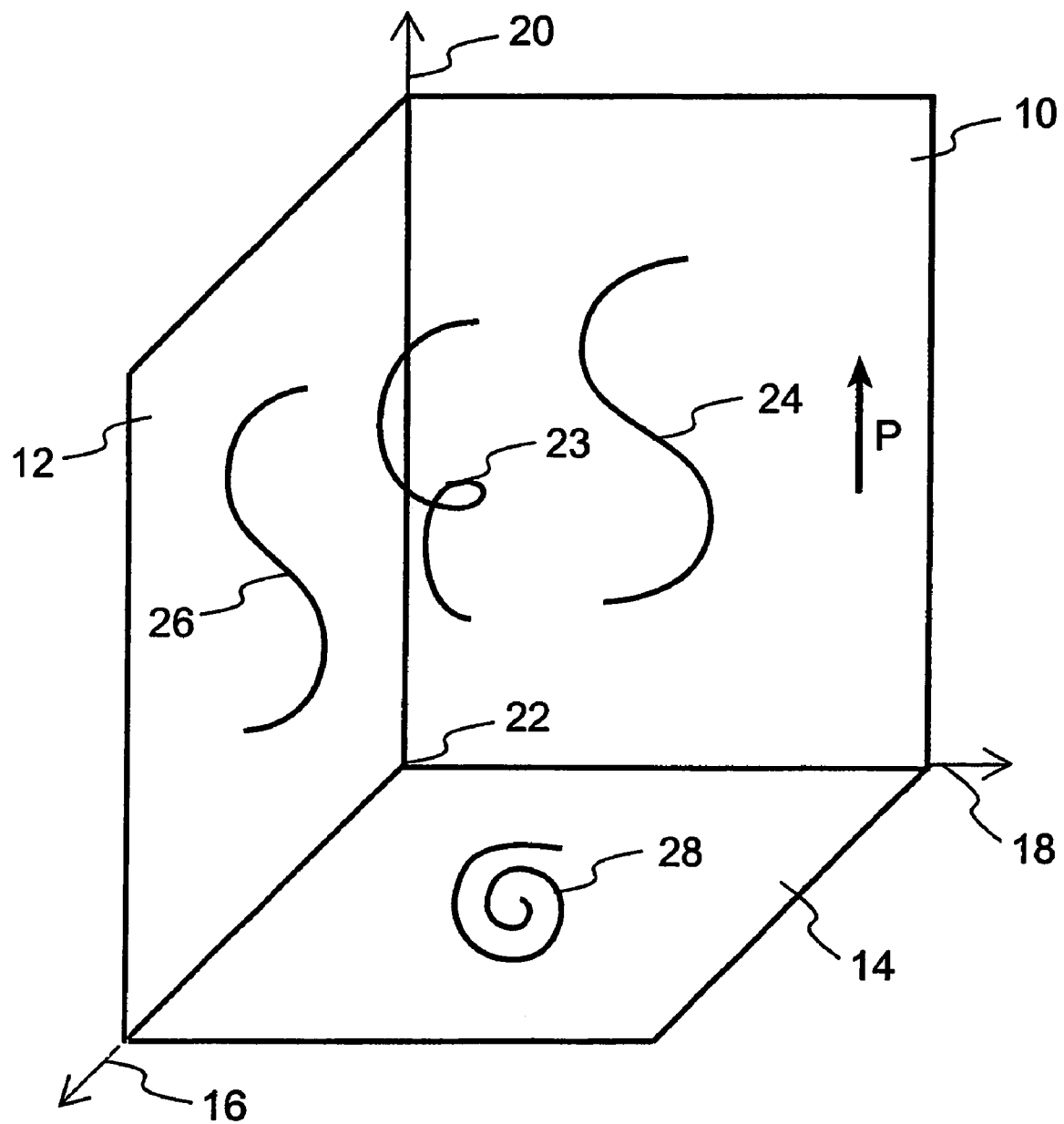
FIG. 2 shows a schematic representation of a curve defined within the three-dimensional volume data set and projected onto the planes of FIG. 1.

FIG. 2 shows a defined curve 23, having a three-dimensional shape. To allow the user to view the curve 23 in two dimensions, it is projected onto each of MPR planes as a two-dimensional projection. Thus there is a projection 24 onto the coronal MPR plane, a projection 26 onto the sagittal MPR plane and a projection 28 onto the transverse MPR plane. Note that the curve 23 may intersect any of the planes, but this will not affect the shape of the projection onto that plane.

For the purposes of generating a curved MPR, the curve 23 is considered to have a primary direction. This is defined as the standard axis whose direction most closely matches the general direction of the curve. Because the curve 23 is three-dimensional, the relationship between the curve 23 and its primary direction is a loose one; for some curves either of two axes might be plausible choices, and if so it will not matter particularly which one is specified. In FIG. 2, the curve 23 has a generally vertical helical shape, so that the transverse axis 20 is considered to be the primary direction. This is marked by the arrow P in the Figure.

A purpose of denoting the primary direction is that the standard MPR plane whose normal is parallel to the primary direction is distinguished from the other two MPR planes for generating the curved MPR view. Since cineing of this MPR plane moves along the primary direction and hence also moves along, or tracks, the curve, it is defined as the "tracking MPR" in the remainder of this description.

Curving (Relative to) a Standard MPR

To be most useful to the viewer, curved MPR views are preferably as similar as possible to a familiar standard planar MPR. To comprehend the complex spatial concepts involved in curved MPR views, users typically think of making a curved MPR view by curving one of the standard MPR planes just enough to make it follow the curve. Therefore, from the point of view of ease-of-use, an advantageous way of generating a curved MPR view is to specify the standard MPR plane relative to which the curved MPR view is to be generated. This gives an MPR view which has a viewing direction for the user roughly parallel to the viewing direction from which the standard MPR plane is displayed. This helps the user to put the curved MPR image into context within the patient, because the user is aware of the direction from which he is looking at the imaged anatomical structure. For the sake of brevity, this will be referred to as "curving a standard MPR", although in fact the original MPR view is unaffected; it is simply the standard view to which the curved MPR view is most similar.

Since the MPR plane that is to be curved is one that is as close to the curve as possible, it cannot be the tracking MPR view; instead it is one of the other two standard views. Hence, particular roles are assigned to two of the standard MPR planes; one that is to be curved, and one that tracks the curve.

Extrusion Plane

The third remaining standard MPR plane also has a special role. It is used as an extrusion plane. The curve is extruded through this plane to produce a curtain-like sheet. This is an extruded image, which when pulled flat (and possibly subject to further image processing such as magnification, panning and rotating) forms the curved MPR image.

The extrusion plane is a plane in the volume whose normal is called the extrusion direction. This is the direction along which the curve is extruded; such that the extrusion defines a curved sheet within the volume. The extrusion direction completely determines the content of the extruded image. The position of the extrusion plane, defined as its distance from the origin of the volume data set, is not relevant. It is used only to allow absolute vertical co-ordinates to be defined in the extruded image.

Extruded Image

The extruded image is the sampled curved image, before it is magnified, panned and rotated in the plane of the user's display screen to produce the curved MPR image. The co-ordinate space of the extruded image is well-defined, separately from that of the volume data set. This allows any extruded image to be treated and displayed in the same manner regardless of tracking plane and extrusion direction.

Figure 3:
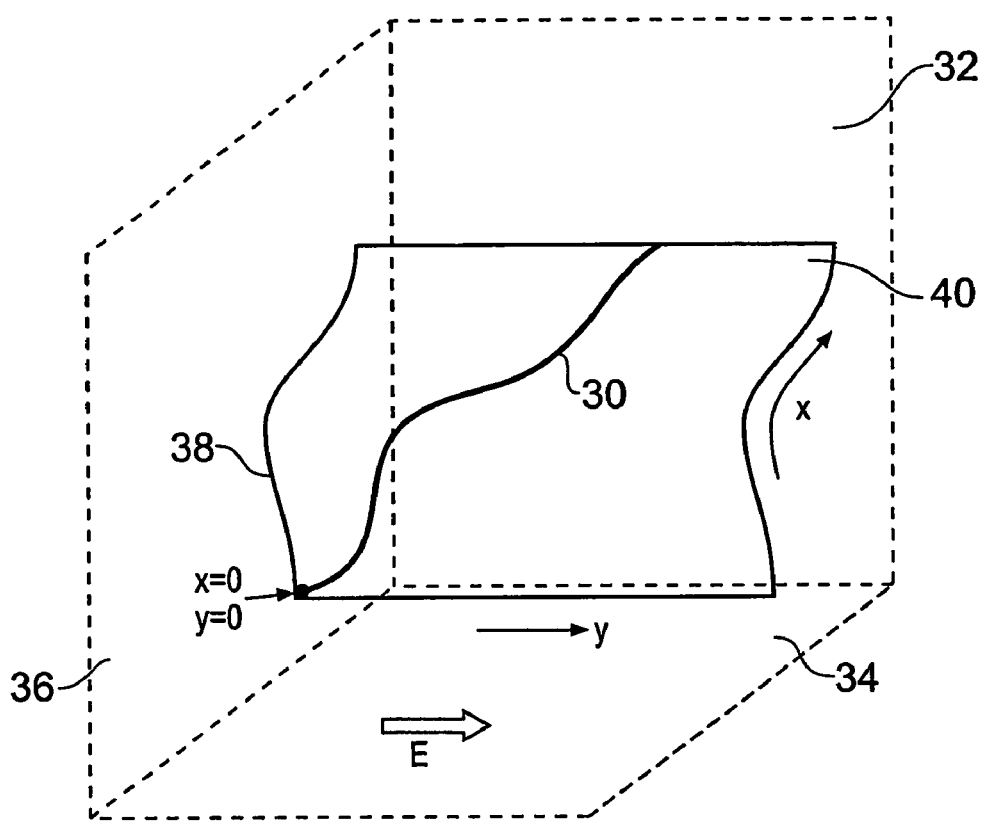
FIG. 3 shows a schematic representation of a curved sheet extruded from a curve defined within a three-dimensional volume data set.

FIG. 3 illustrates this co-ordinate space. A curve 30 has been defined, and has an associated tracking MPR plane 34, an MPR plane "to be curved" 32, and an extrusion plane 36. The curve 30 is projected onto the extrusion plane 36 to form a projected curve 38. The curve 30 has been extruded along an extrusion direction E to produce an extruded image 40. The vertical direction, or y-axis, of the extruded image 40 is defined to be the extrusion direction (note that in FIG. 3, the y-axis is horizontal, meaning that the extruded image 40 will be rotated before display as the curved MPR image). The y-axis (the line x=0), contains the start point of the curve 30. Moving along any line x=constant by some number of units moves through the volume, and across the extruded image 40, by a corresponding amount in the extrusion direction E. The x-axis (the line y=0) corresponds to the projected curve 38 on the extrusion plane 36. Moving along any line y=constant by some number of units moves through the volume and across the extruded image 40 by a corresponding distance in the (varying) direction of the projected curve 38.

Hence, the distance of the extrusion plane 36 from a point on the curve determines the vertical, y, co-ordinate of that point in the extruded image 40. Points on the projected curve 38 on the extrusion plane 36 are at y=0. Progress along the projected curve 38 corresponds to horizontal displacement on the extruded image; the start of the curve is at x=0.

The curve 30 itself is contained within the extruded image. It has a displacement in the y direction that tracks its distance relative to the extrusion plane 36. The length of the curve 30 as it appears in the extruded image is equal to its true length in the volume. Hence accurate anatomical measurements of the imaged curved structure can be made directly from the curved MPR view.

Figure 4:
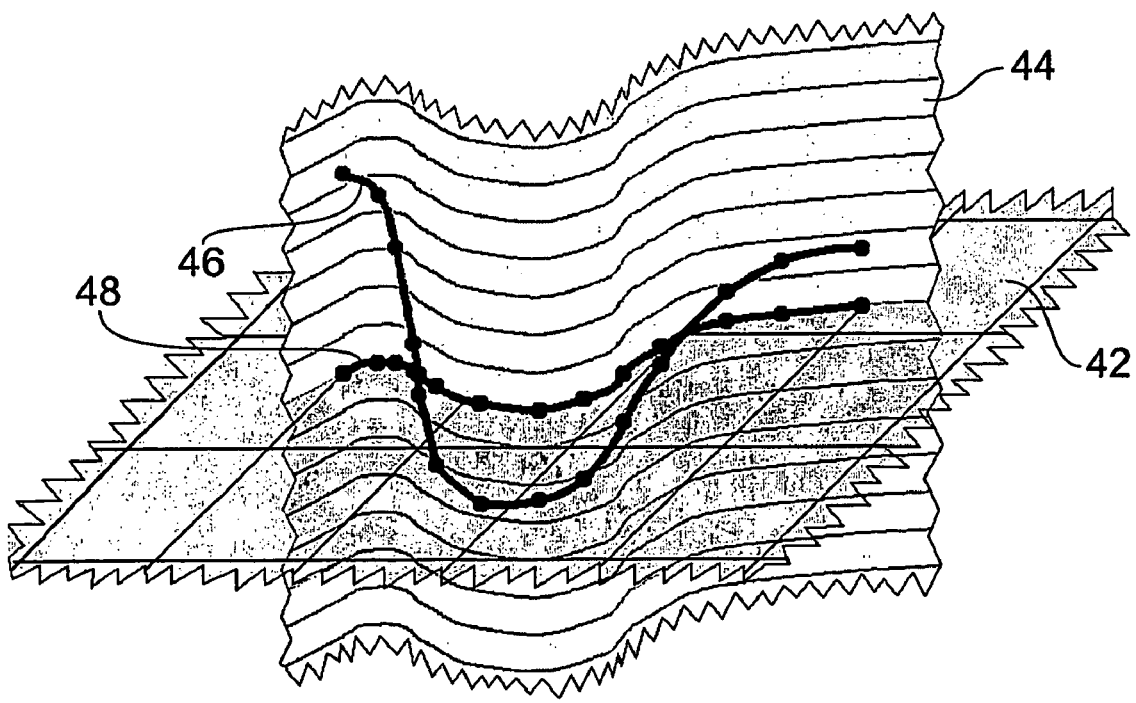
FIG. 4 shows an alternative schematic representation of a curved sheet extruded from a curve defined within a three-dimensional volume data set.

FIG. 4 shows an alternative illustration of an extruded image, with the spatial relationships between the extrusion plane 42 and the extruded image, or curved MPR sheet 44. The latter is defined from the former by projecting and extruding the curve 46. Note that the extrusion plane 42 and curved sheet 44 are both unbounded in extent and only a ragged portion of each is shown in the Figure. The curve 46 intersects the extrusion plane 42 and is contained within the curved sheet 44, retaining its true length. The projected curve 48 is contained in both the extrusion plane 42 and in the curved sheet 44. When the curved sheet 44 is pulled out flat to form the 2D curved MPR view, the projected curve 48 appears as a horizontal line on this image, and the curve 46 itself dips above and below this horizontal as it proceeds from left to right, just as it dips above and below the extrusion plane 46.

First Embodiment

As is evident from the foregoing description of curved MPR, there are many variables which affect the final curved MPR image displayed to the viewer. These include the shape of the curve, the tracking MPR plane, the primary direction of the curve, the MPR plane "to be curved", and the extrusion direction. The embodiments of the present invention seek to provide the user with as much flexibility in selecting and modifying these variables as possible while maintaining an easy-to-understand user interface. This allows the user to be confident that the final curved MPR image depicts the relevant parts of the patient, so that accurate clinical decisions can be based thereon.

Thus the present invention is concerned with the user interface of a computer implemented curved MPR image processing package. It provides the user with the ability to make a range of choices, and to modify the choices after generation of the MPR image. This is in contrast with prior art systems, which allow limited user input and/or have confusing or misleading user interfaces, and also make assumptions in generating the image which the user cannot influence.

Figure 5:
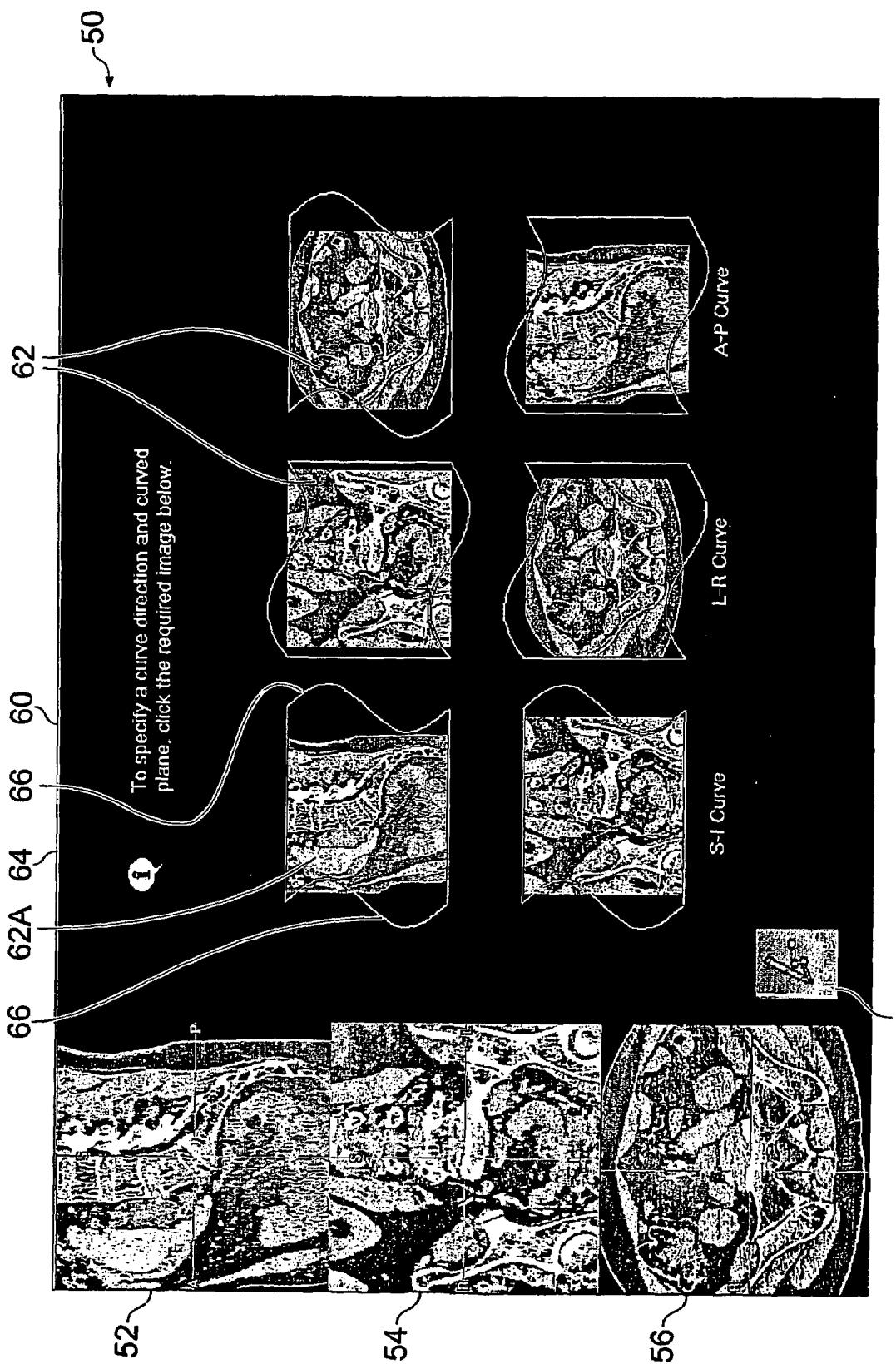
FIG. 5 shows a first screen shot of a first embodiment of a user interface according to the present invention.

FIG. 5 shows an example user interface according to a first embodiment of the invention. The interface allows the user to generate and view a curved MPR image from a pre-recorded volume data set.

The user interface 50 is displayed to the user on a suitable display device such as a computer monitor. The interface 50 includes four display areas. Three of these areas display three orthogonal standard planar MPR views of the volume data set under consideration. Thus there is a sagittal view 52, a coronal view 54 and a transverse view 56. Each of the views can be cined by operation of associated cine controls (not shown) such as a mouse wheel, scroll bar or cine control window, which can be activated by the user with a mouse or other computer user input device. The planar MPR views 52, 54, 56 are generated from the volume data set and displayed to the user using standard image processing techniques.

The fourth display area 60 initially displays a set of six icons 62. These allow the user to make various selections regarding how the curve is defined, displayed and used to generate a curved MPR view. The user is required to select the tracking MPR plane, and hence the primary direction of the curve. Also, the standard MPR plane which is to be curved must also be specified. Since this cannot be the tracking MPR, there are six possible combinations of planes. Hence six independently selectable icons 62 are provided, to permit selection of any of these combinations. Each icon 62 corresponds to a pair of planes, one defined as the tracking MPR plane, and the other defined as the MPR plane which will be curved. In the example presented, the tracking MPR plane is defined by the columns of icons, and the main direction along which the tracking MPR plane travels moves along the curved lines of the icons. If the curve is mainly in the superior-inferior direction, the tracking MPR plane is the transverse plane. If the curve is mainly in the left-right direction or the anterior-posterior direction, the tracking MPR plane is the coronal or sagittal plane respectively. Thus, by selecting one of the six icons 62, the user indicates his choice of any of the combinations of the relevant planes, so that the resulting curved MPR view best shows the anatomical feature of interest.

Each of the six choices are of the form "the primary direction of the curve is along the Foo axis—i.e. the Foo MPR is the tracking MPR—and the curved MPR should be based on the Bar MPR view", where Foo and Bar are distinct standard axes. The choice is expressed as "Curved Bar following a Foo curve". The choices therefore are:

Curved Sagittal following a Transverse curve
Curved Coronal following a Transverse curve
Curved Sagittal following a Coronal curve
Curved Transverse following a Coronal curve
Curved Coronal following a Sagittal curve
Curved Transverse following a Sagittal curve These are denoted on the various icons 62 by a small thumbnail version of the standard, planar Bar MPR view currently displayed in the relevant first, second or third display area. Superimposed over the view is a pair of generic curves in the relevant Foo direction. These indicate the general direction of the curve, and also represent curvature of the underlying view. A single line could be used instead. Thus in FIG. 5, the top left icon 62A shows a sagittal MPR view 64 with pair of parallel curved lines 66 indicating that the view is to be curved, and representing a generic transverse curve, and hence the icon 62A corresponds to a "Curved Sagittal following a Transverse curve".

The user thus selects one of the icons 62, to begin the curved MPR generation process. Once the selection is made, the icons 62 are removed, and the fourth display area 60 is made available for display of a curved MPR image.

Figure 6:
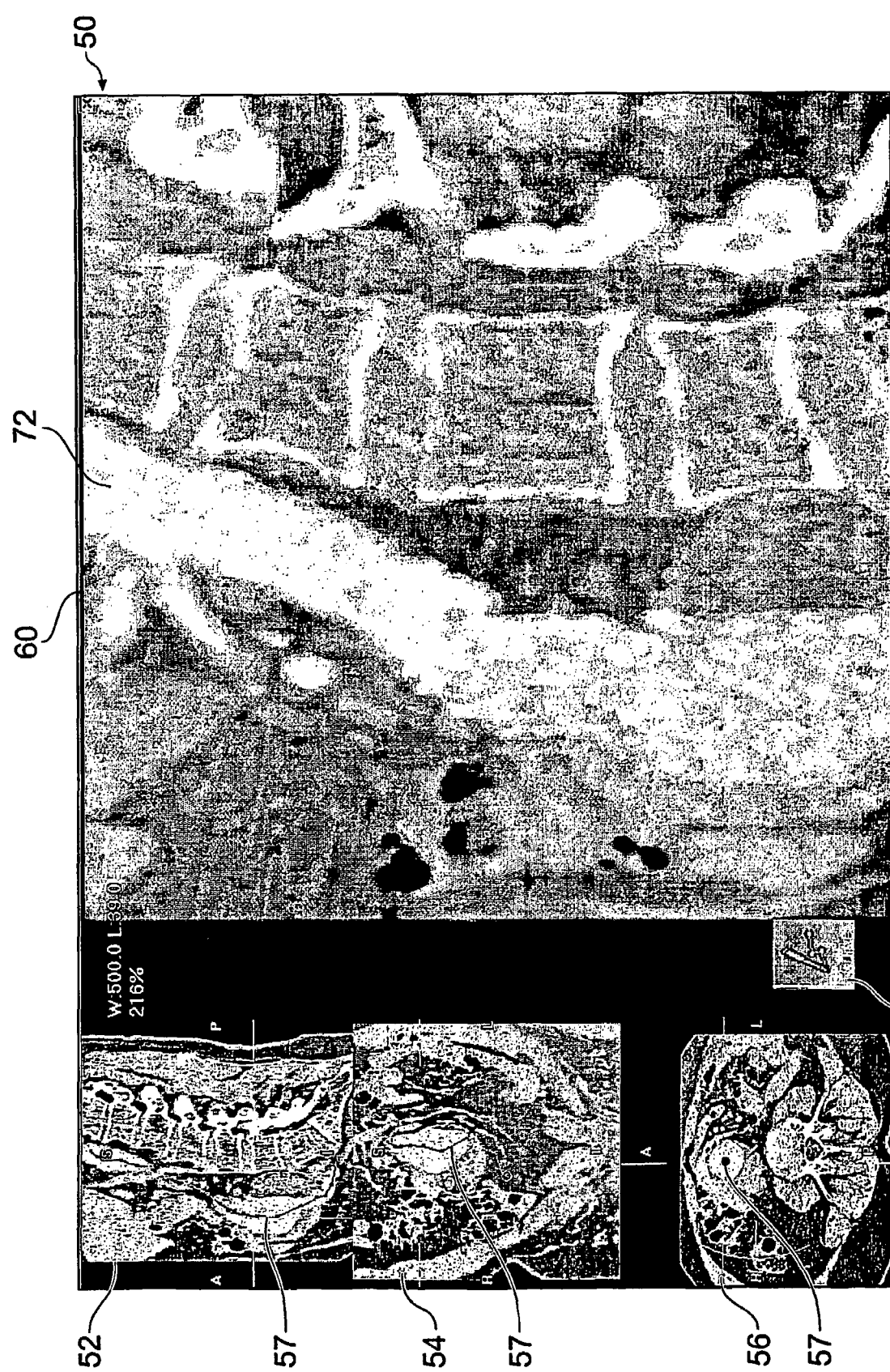
FIG. 6 shows a second screen shot of the user interface of FIG. 5.

FIG. 6 shows the user interface 50 with a curved MPR view 72 in the fourth display area 60.

The user interface 50 also includes a curve drawing tool 70 which allows the user to define the curve. After selecting one of the icons 62 shown in FIG. 5, the user selects the curve drawing tool 70, for example with the mouse, and is provided with a movable pointer icon, which can be positioned over any of the standard MPR views 52, 54, 56 and used to "drop" points to trace out the curve, along the desired path of interest. The dropped points are displayed as small dots, connected with thinner lines. All of the standard MPR views are available for this purpose, and by cineing the views, the user can move through the volume data set to define the curve. As the curve is drawn, it is projected onto each of the standard MPR views, and displayed in the first, second and third display areas 52, 54, 56 as projected curves 57 so that the user can see its shape in each of the three orthogonal directions. A particularly convenient way of drawing the curve is to move along the primary direction by cineing the tracking MPR view, and dropping points where appropriate.

As the curve is defined, the information input by the selection of an icon 62 is used to generate a curved MPR view from the curve. This view 72 is displayed in the fourth display area 60.

Once defined, the curve can be edited, or altered, by dragging any of the points over the standard MPR images or by deleting unwanted points. The curved MPR view 72 is recalculated, and the content of the fourth display area 60 is updated accordingly. The standard MPR views are maintained on display at all times, and can be cined as required to provide an alternative view. Thus the user is provided with a dynamic, editable display, which can be altered, if improvement or comparison is desired, and which is based on full user choice of the relevant parameters needed to generate the curved MPR image.

Second Embodiment

The user interface of the first embodiment can be modified for display of cross-curve MPR views. To generate a cross-curve MPR view, it is only necessary to specify the primary direction of the curve. There is no "curving" carried out, so there is no need to select a MPR view "to be curved". Consequently, there are only three possible options to choose between, instead of the six required for a curved MPR view.

Each of the three choices are of the form "the primary direction of the curve is along the Foo axis—i.e. the Foo MPR is the tracking MPR", where Foo is a standard axis. The choice is expressed as "Create a Foo curve". The choices therefore are:

Create a Transverse curve
Create a Coronal curve
Create a Sagittal curve

In the second embodiment, each choice is represented by a pair of icons, showing the two non-Foo MPR views adorned with a generic curved line or lines to represent the Foo curve. Thus six icons are again provided, and may be the same as those used in the first embodiment and shown in FIG. 5, since the same information is provided. However, in the second embodiment, the icons are coupled together into three pairs, each pair having a common Foo curve. Selection of the icons is thus limited to selection of one of three pairs; the icons are not individually selectable. Selection of either of a pair produces the same effect.

Once a pair of icons has been selected, the icons are removed from the fourth display area, which is now used to display a cross-curve MPR.

Figure 7A:
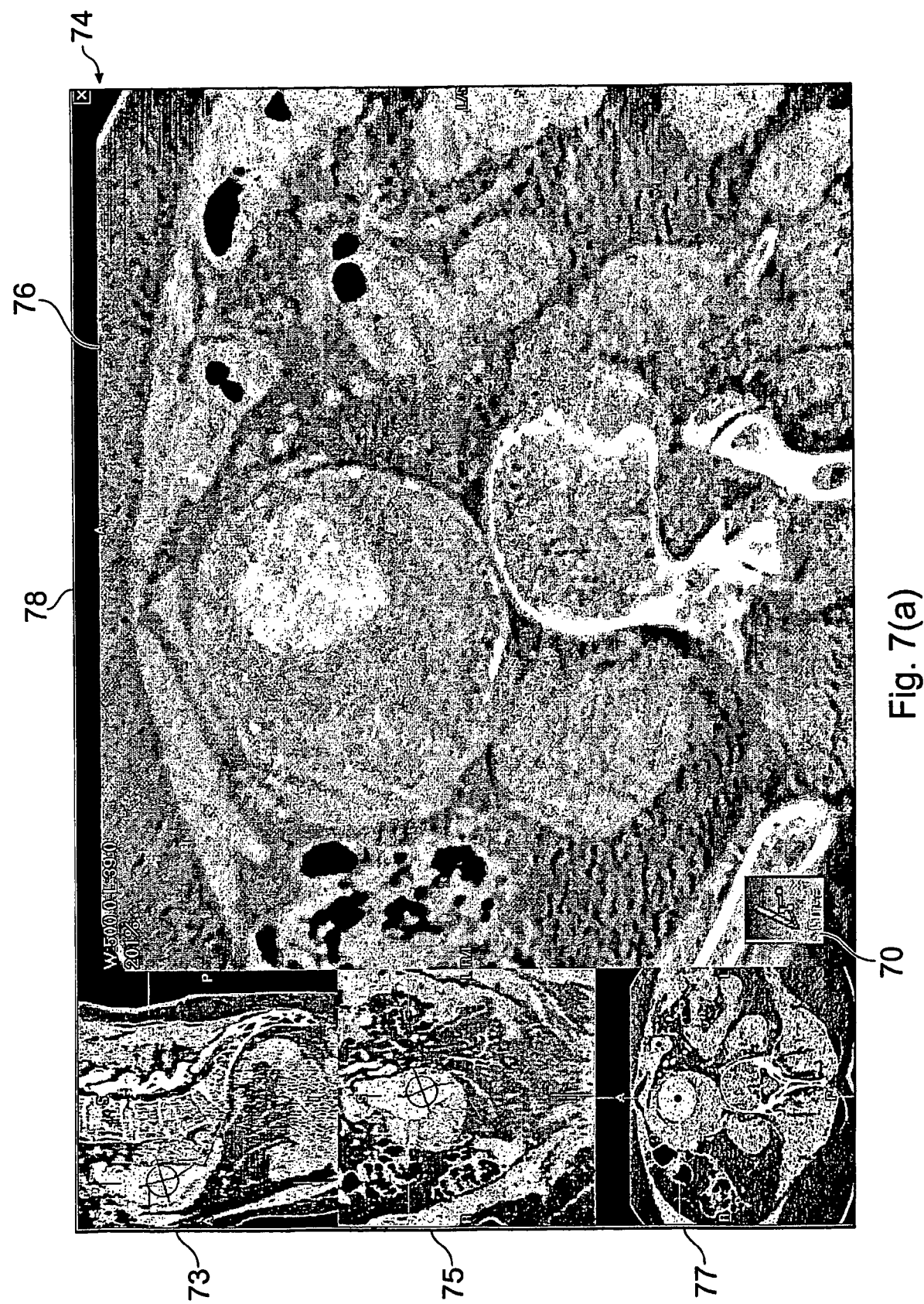
FIG. 7(*a*) shows a screen shot of a second embodiment of a user interface according to the present invention.

FIG. 7(a) shows a user interface 74 of the second embodiment having a cross-curve MPR image 76 displayed in the fourth display area 78. The first, second and third display areas 73, 75, 77 display the standard planar MPR views as before, and a curve drawing tool 70 is again provided. Using the curve drawing tool 70, the user can draw a curve by dropping points on any of the standard MPR views, as before. The cross-curve MPR view 76 shown in the fourth display area 78 is the planar MPR view which is perpendicular to a point highlighted on the curve. As the curve is being defined or edited, the cross-curve MPR view shown corresponds to the most recently dropped point. Alternatively, and after the curve is complete, any of the intermediate points can be highlighted by the user, and the corresponding cross-curve MPR view will be displayed. The curve can be edited and altered by repositioning any of the dropped points, and the displayed cross-curve MPR view will be updated accordingly.

Third Embodiment

A user interface for cross-curve MPR can alternatively have three icons instead of six icons linked in pairs, since the choice of the user is limited to the selection of one of three directions for the curve. Hence one selectable icon is provided on the interface for each of the three directions. Once again, thumbnail versions of the standard planar MPR images can be used. However, in this embodiment, the thumbnail shows the tracking MPR plane, instead of the MPR plane which is to be curved. There is no requirement for any curved lines to be overlaid on the icons, because the MPR images shown are not going to be curved, and the curve itself is going to be roughly normal to the image. Thus the information suggested by the curved lines of the first and second embodiments is not relevant.

Figure 7B:
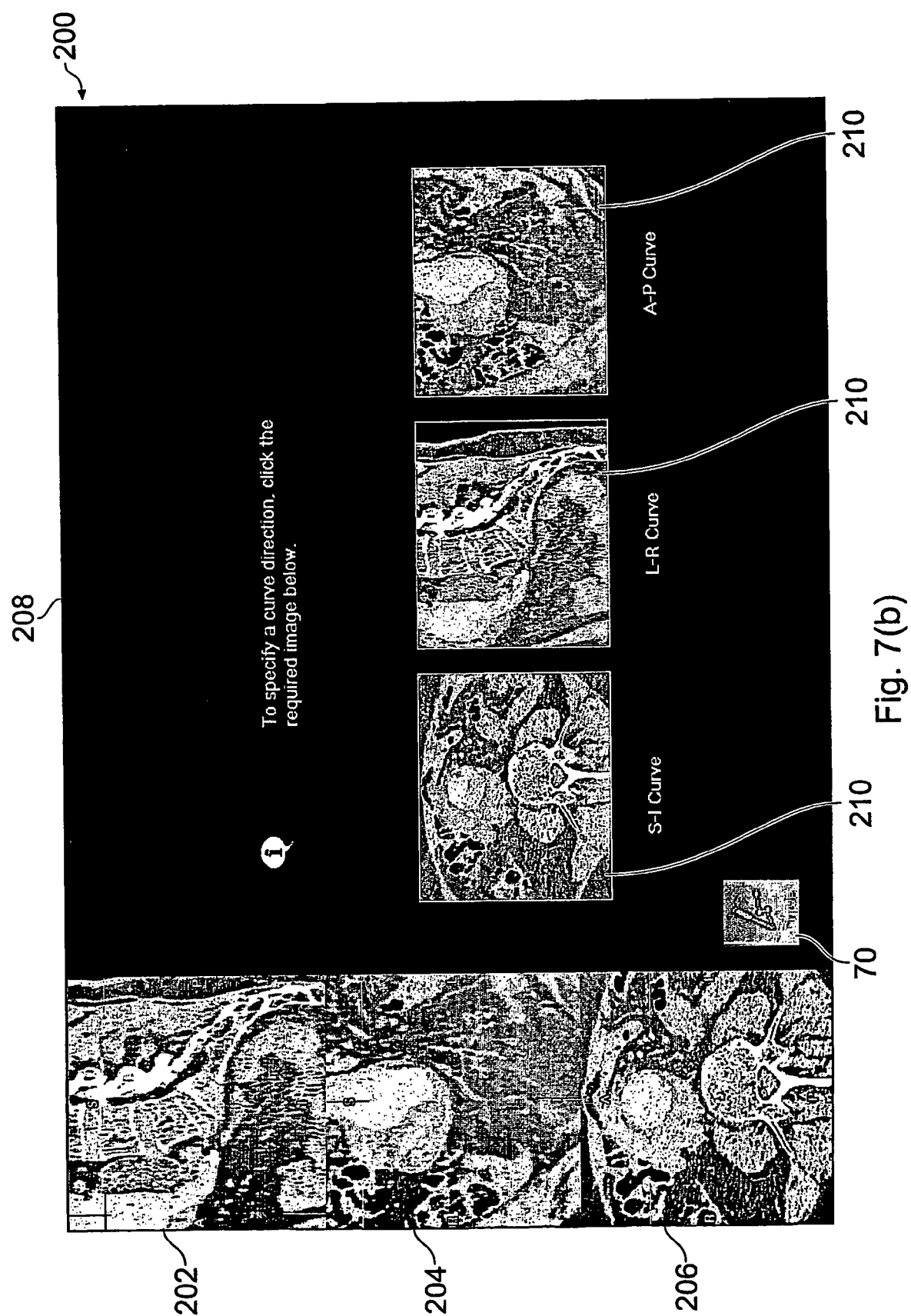

FIG. 7(b) shows a user interface 200 with icons of this type. As before, the user interface 200 has first, second and third display areas 202, 204, 206 in which are displayed three orthogonal planar MPR images. A fourth display area 208 contains three icons 210. Each icon 210 shows one of the three planar MPR images, and can be individually selected by the user to indicate which is the desired tracking MPR plane. Once selection has been made, the icons 210 are removed from the fourth display area is 208, which is then used to display a cross-curve MPR view after the user has defined part or all of a curve by using the curve drawing tool 70 to drop points along the curve on one or more of the planar MPR images in the first, second and third display areas 202, 204, 206. The user interface 200 will then take on the appearance of the interface shown in FIG. 7(a).

Fourth Embodiment

The cross-curved MPR user interface described as the second embodiment can be supplemented by further providing a facility for curved MPR. After the curve is defined, and the cross-curve MPR views studied, the user may wish to progress to a curved MPR view. A curved MPR tool or menu option (not shown) is provided in the user interface for this purpose, which can be activated by the user. Once the curved MPR option is selected, the cross-curve MPR view is removed from the fourth display area 78, and is replaced by the originally selected pair of icons 62, together with the other four icons.

Figure 8:
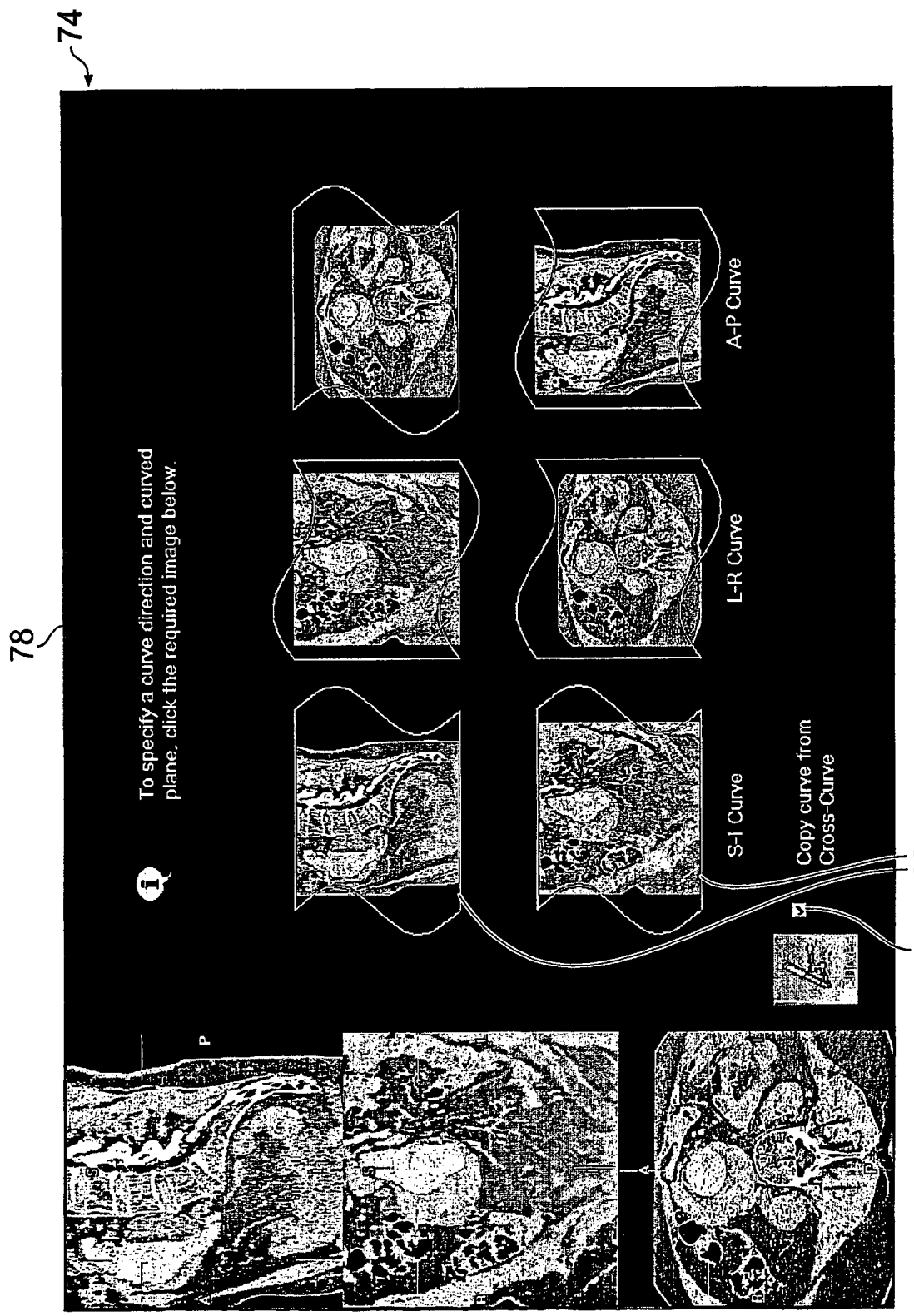
FIG. 8 shows screen shot of a fourth embodiment of a user interface according to the present invention.

FIG. 8 shows the user interface 74 in this state. The two icons 62 selected previously to define the tracking MPR are displayed in the fourth display area 78, together with the four unselected icons. The selected icons are distinguished by the position of a selector button 80 located on the user interface 74 underneath the icon pair. Hence the user is directed to the correct pair of icons. Alternatively, the previously unselected icons may be made feint, not displayed, or otherwise presented as being unavailable for selection.

The relevant pair of icons are now decoupled from each other, so as to be individually selectable. The user selects one or the other, according to which MPR plane is the desired MPR plane "to be curved". After selection, the information is used to generate the curved MPR view from the curve, and the curved MPR view replaces the icons in the fourth display area, as in the first embodiment. The user is then free to edit the curve in any of the standard MPR views, to modify the displayed curved MPR view.

This functionality can also be provided in conjunction with the third embodiment, in which three icons are provided to allow the user to select the tracking MPR plane before defining a curve for cross-curve MPR. In this case, when the user chooses to perform curved MPR by activating the relevant option, a pair of icons are displayed in the fourth display area. The icons are individually selectable, and show the two standard MPR planes which are orthogonal to the plane previously selected to be the tracking MPR plane, and which can therefore be "curved" to generate a curved MPR image. These icons can be those described in the preceding paragraph, and hence may be displayed as a single pair, or as part of the six icons used for curved MPR.

Fifth Embodiment

The curved MPR and cross-curve MPR facilities can be combined as alternatives in a single user interface. In this embodiment, a menu, buttons, or other suitable onscreen control is provided as part of the user interface. This control offers the choice between curved MPR and cross-curve MPR. At the start of a viewing session, the user picks one of the two options, and the appropriate icons are then displayed in the fourth display area. After an icon or icon pair is selected, the imaging continues as per the first or second embodiments. If desired, the control can be further operable to allow switching from cross-curve MPR to curved MPR once the curve has been defined, as according to the fourth embodiment, or from curved MPR to cross-curve MPR.

The use of six icons offering the choice of any pair of MPR planes is of particular benefit in the present embodiment, because very little modification need be made between the information displayed to the user in either of the two modes. If the same arrangement of icons is used for each mode, the only difference required is that the icons are presented as either individually selectable, or selectable only in pairs.

Further Embodiments

Arrangement of the User Interface

The embodiments presented above each use a configuration in which the icons are intially displayed in the fourth display area, and then removed and replaced by a curved or cross-curve MPR image when all or part of the curve has been defined by the user. This makes effective use of the space available on the user interface. Removal of the icons allows a larger scale, higher resolution MPR image to be displayed, thus presenting maximum MPR information to the user.

However, while advantageous, this is not required for all embodiments of the invention. In an alternative arrangement, the icons can be displayed in an alternative part of the user interface, separate from the fourth display area. They can then be removed when the MPR image is displayed, or alternatively can be retained. This permits the user to easily reselect a curve direction and/or view direction using the icons, to restart the imaging if it is found that the initial selection is not producing a suitable image. Additionally, the icons can be presented in such a way that the user can chose whether to view or hide them after one of them is selected. If hidden, the MPR image can then be enlarged.

Icons

The icons 62 have been described thus far as comprising small versions of the currently displayed standard planar MPR views from the first, second and third display areas. This allows the user to best visualise how the final curved MPR view may appear. However, the icons will differ completely for every volume data set, so need to be recreated for each viewing session, and are also updated each time any of the standard views is manipulated through actions such as cineing, zooming and panning. Therefore, this configuration requires sufficient computer buffer memory and adequate processing power.

An alternative arrangement is to use generic icon images which are not derived from standard MPR views of the data set being studied. These can be simple outline drawings or figures representing the various orthogonal views in an informative but non-complex manner. Different sets of icons can be provided for various body parts, in which case the user may be asked to specify the anatomical features he intends to look at before the session begins. Alternatively, volume data sets may be stored with associated tags giving details of their subject matter, which can be read by the software as a data set is imported for use, and used to present a suitable set of icons. Further simplification can be provided by limiting the interface to only one set of icons, showing orthogonal views of a body part such as the head, which will convey the meaning of sagittal, coronal and transverse planes in a readily recognisable manner. Generic icon images may be less confusing to tell apart than reduced versions of the MPR views, which may be very rich dense images which become unclear when reproduced on a small scale.

Figure 9:
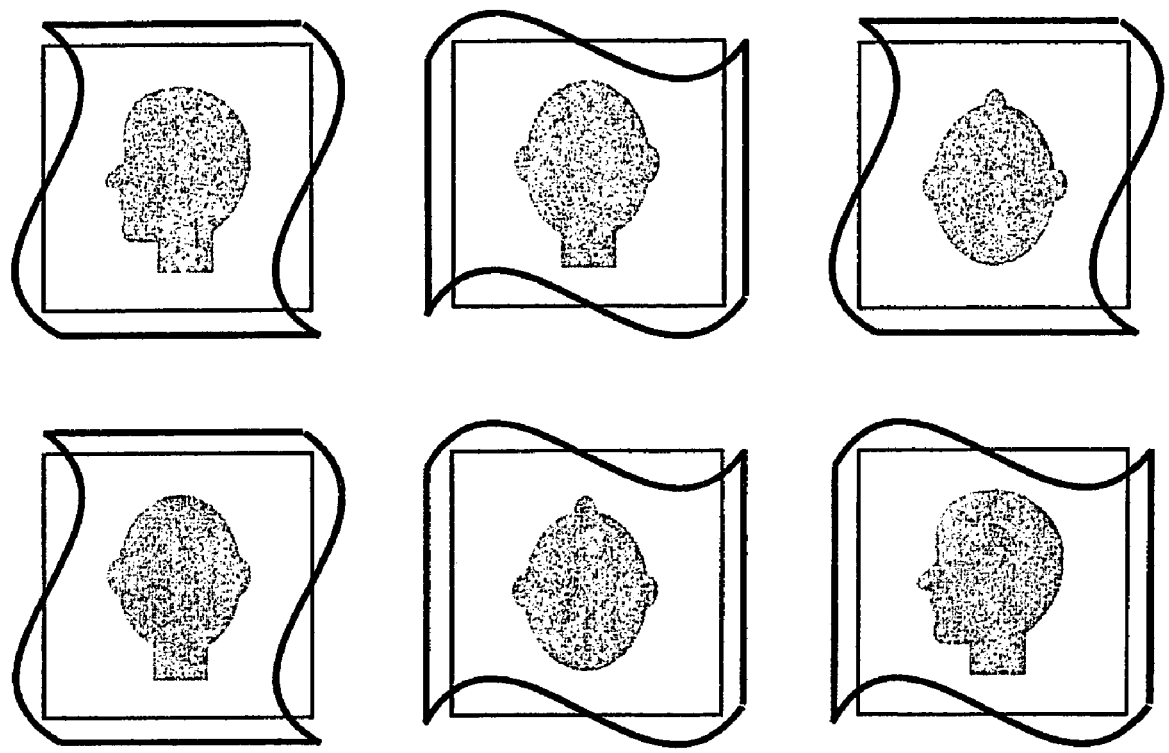
FIG. 9 shows an example of six icons comprised within a further embodiment of a user interface.

FIG. 9 shows a set of icons of this type, featuring simple generic orthogonal outline images of a head, with overlaid lines indicating curvature.

Alternatively, the icons take the form of descriptive boxes, with no images. This is very informative for the user, but makes the interface less compatible with foreign usage, and reduces visualisation.

In a further alternative, text and images can be used together to combine the advantages of the various icon types.

Rotating the Curved MPR View

Although the user makes an initial selection of the standard MPR plane to be curved to generate a curved MPR view, it is desirable if this choice is not limiting, and can be modified during viewing.

This can be achieved by providing for rotation of the extrusion plane about an axis aligned with the primary direction of the curve. This in turn rotates the alignment that the curved MPR view has been made similar to (the view that has been curved) because this, the extrusion plane, and the tracking view are always mutually orthogonal. The ability to perform such a rotation means that the initial choice of standard MPR view on which to base the curved MPR view is not a final one; it can be changed without any need to redraw the curve. In addition, while the initial choice is constrained to alignment with one of two standard MPR planes, the rotation can access oblique alignments between these two standard views. Further, the rotation provides a simple way to review images of all parts of the object of interest that are close to the curve.

To this end, in an embodiment of the present invention, a manipulatable tool in the form of a pair of directional decorations is superimposed on the tracking MPR view. The user can perform a rotation by manipulating these decorations to rotate them around the centre of the view.

Figure 10A:
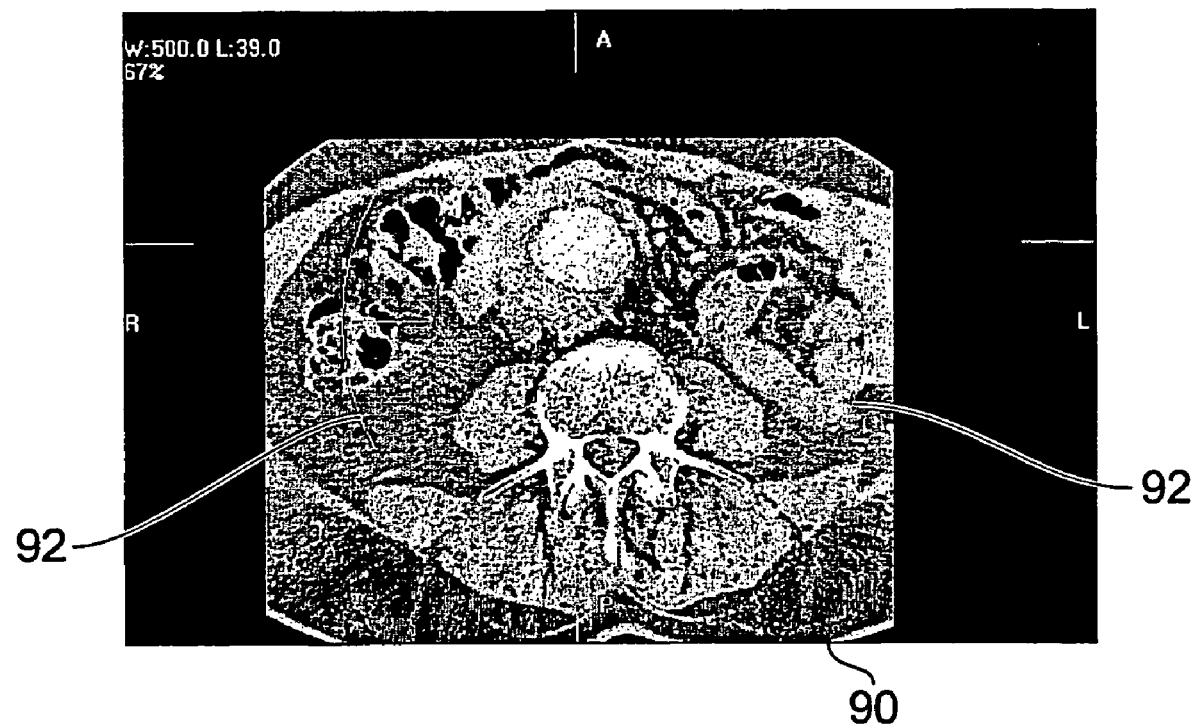
FIGS. 10(*a*) and 10(*b*) show examples of manipulatable tools for providing view rotation control according to further embodiments of a user interface.

FIG. 10(a) shows an example tracking MPR view with the directional arc decorations. The tracking MPR 90 is an axial view of a patient's torso The arcs 92 define two opposite parts of the circumference of a circle centred on the view centre.

Additionally, the arcs may be embellished with intersecting arrows or lines aligned along a diameter of the circle.

Figure 10B:
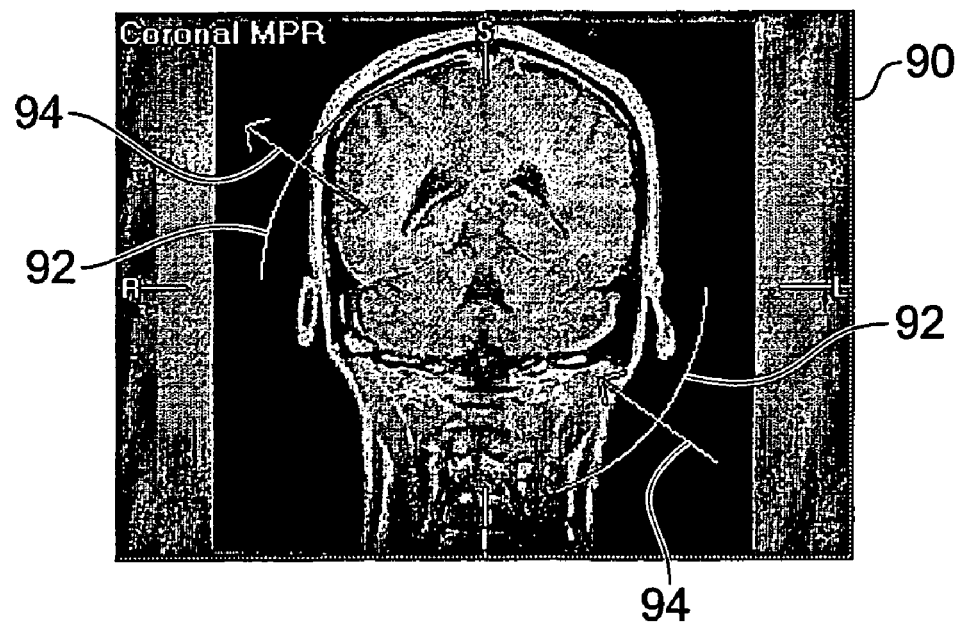

FIG. 10(b) shows an example tracking MPR image 90 (a coronal view of a patient's head) with a tool of this type. The arcs 92 each have an intersecting arrow 94. Both of the arrows 94 point in the direction along which the viewer views the alignment of the MPR plane that has been curved. In turn this is approximately the view vector for the curved MPR view. The rotation can be performed over a whole 360°, with the image appearing to be reflected for 180° rotations. The arrows represent a viewing direction only, and no positional information. Their location relative to features of the image in the tracking view does not influence the result of a rotation.

Alternatively, the system can be arranged to limit the effect of rotation by orienting the curved MPR image in the orientation most appropriate for the standard orthogonal MPR closest to itself. For example, if it is most like the sagittal MPR during rotation, it will be oriented with the superior direction at the top of the image and the posterior direction to the right, as if the patient was looking left. The effect of this is that the image is not reflected if rotation is through 180°. An advantage of this is that default clinical orientations can be used at all times, which avoids confusion for users such as radiologists who are used to viewing radiological images in particular orientations (according to clinical standards) to reduce errors that may occur when viewing symmetric anatomy.

Orientation of the Displayed MPR View

When rotation of a curved MPR view is carried out, typically the projection of the curve onto the extrusion plane will change. Since the changing length of the projected curve is equal to the width of the extruded image, the content of the curved MPR view alters under rotation. This may cause software stability problems. An advantageous way of addressing this is to set the extrusion plane at a depth in the volume that bisects the curve, so that the average depth of the curve relative to the extrusion plane is approximately zero. Any vertical pan used to display the rotated view should be amended appropriately so that no visible difference in the width results. This will keep the curve from drifting vertically in the extruded image under rotation. Any horizontal pan should also be amended so as to keep the centre of the curve from drifting horizontally; the horizontal pan applied to the extruded image after a rotation should preferably equal that applied before the rotation, minus half the change in the length of the projected curve.

The curved MPR view is desirably displayed with an orientation the same as that of the underlying planar MPR view that has been curved to generate it; this assists the user in interpreting the images. The orientation defines which part of the image is displayed uppermost and which side is placed to the left or right. To achieve this, the orientation can be used as the default display orientation. For example, for a curved coronal view, the default orientation has an up vector that points to the superior (head) of the patient, and is mirrored or not such that the end of the curve that is closest to the right of the patient appears leftmost on the curved MPR image.

However, under rotation, the underlying planar view must be updated if the desired orientation is to be maintained. Thus, in a preferred embodiment featuring rotation of the curved MPR view, the underlying flat view is rotated too. Thus, in the preceding example, if a transverse curve is assumed, the flat view changes from a coronal view to an oblique coronal view, then to an oblique sagittal view, then to a sagittal view, etc. The same policy regarding default orientation continues to apply; the default orientation will "snap" between one based on coronal alignment and one based on sagittal alignment at the point when the underlying planar view moves from being an oblique coronal view to an oblique sagittal view.

A similar default orientation arrangement can be applied to display of a cross-curve MPR view. In this case, there is no facility for rotation about the curve. Instead, the user is able to move along the curve by cineing the tracking MPR view. The cross-curve MPR view at the point shown in the tracking MPR view is displayed. It is desirable for orientation to be maintained during such cineing, so the cross-curve view is automatically rotated and flipped so that the view displayed at any time is in the default orientation.

Display of the Curve

As discussed, during and after definition the curve is displayed in a projected format on each of the three orthogonal planar MPR views. This typically works well for the "to be curved" MPR view and for the MPR view parallel to the extrusion plane.

However, for the MPR tracking view, too many points and curve segments tend to project to the same place or general area on the MPR. This tends to be unhelpful and confusing for the user. Therefore, in an embodiment of the invention, a different approach is taken for displaying the projected curve in the tracking view. Only the curve points that are less than a predefined distance on either side of the current location of the tracking MPR are displayed. This limits the displayed projected curve to a small but relevant portion, and removes confusing detail. Curve segments are similarly clipped; only the projection of the portion of each curve segment that intersects the slab-like space within the predetermined distance from the MPR plane is shown. While the predetermined distance can be selected as any appropriate distance which avoids clutter of the curve on the tracking MPR, a useful distance is the cine index distance, which the amount by which a plane is shifted between adjacent views when that plane is cined. Multiple amounts of the cine index distance may also be used.

When the cine index distance is used, the net effect of the clipping is that when the user cines the tracking MPR to a new position while defining the curve, there will be no projected curve or control points visible. When a new point is placed, that point will be visible, and some part of the line segment that leads to it from the previous point (which is too far distant to be visible itself.) If the user places more than one consecutive point on the same tracking MPR plane, then this part of the line will be visible just as when placing points on a non-tracking MPR. If the user cines back to previously visited positions then he will see the nearby parts of the curve and control points previously dropped.

Appearance of the Curve

In embodiments in which a cross-curve MPR view can be displayed, it is useful to provide the user with a visual indicator showing the orientation of the plane of the cross-curve MPR view within the image volume. This is conveniently done by superimposing a suitable symbol on one or both of the two non-tracking standard MPR views, which are typically roughly parallel to the curve. The symbol may comprise a small circle centred on the curve point at which the cross-curve MPR view is located, and a straight line running across the circle to mark the intersection of the cross-curve view with the standard MPR view. The position of the circle and the angle of the line thus provide an indication of the location and orientation of cross-curve MPR plane relative to the standard MPR view.

FIG. 11(a) shows an example of such a symbol 100. The symbol 100 comprises a circle 102 centred on a point 104 in a curve 106, and a line 108 defining a diameter of the circle 102, all displayed over a standard planar MPR view which can be displayed in any of the first, second or third display areas of the user interface.

A cross-curve MPR view can be derived from a single layer of voxels defining a plane through the volume data set, or from a planar slab-like volume within the volume data set, using standard volume image processing techniques. In the latter case, the user may wish to see the thickness of the slab in relation to the volume data set. To provide this information, the circle-and-line symbol shown in FIG. 11(a) can be modified as shown in FIG. 11(b). The modified symbol 110 comprises a circle 112 centred on a point 114 on a curve 116, as before. However, the single straight line 108 is replaced by a pair of parallel lines 118 offset from the diameter of the circle 112, and representing the intersection of the two faces of the slab with the planar MPR view. The separation of the line 118 therefore indicates the thickness of the slab.

A further enhancement of the display of the projected curve on the standard MPR views, for both cross-curve MPR and curve MPR views, can be achieved by providing a visual indication of the depth of the points of the curve relative to the standard MPR plane. Thus the user can see at a glance whether a particular part of the curve is in front of or behind the plane, and where the curve intersects the plane.

A prior art technique for displaying such information is to modify the size of the displayed points in accordance with their depth, so that the size of a point as displayed is related to the depth of the actual point in the curve relative to the standard MPR onto which it is projected. Points "above" the MPR plane (closest to the viewer) are shown as graphics comprising 3×3 pixels, points in the MPR plane (and hence also in the plane of the screen) are 5×5 pixels, and points "below" the MPR (furthest from the viewer) are 7×7 pixels. While providing useful information, this is disadvantageous in that the large graphics can obscure fine image detail. To address this, an embodiment of the invention uses graphic markers of the same size to represent all points, the graphic markers having differing patterns or designs to indicate depth. The graphic markers are preferably of the smallest possible size. To provide good visibility and enough detail to show the various patterns, a graphic size of 3×3 pixels has been found to be suitable. However, smaller markers can be used if desired; the largest acceptable size is governed in part by the displayed size of the MPR images.

FIGS. 12(*a*) to (*d*) show examples of suitable graphic markers for indicating the depth of the curve in this manner. The markers are shown at an enlarged resolution for illustrative purposes. From left to right, FIG. 12(*a*) shows a graphic marker 120 for a point on the MPR plane comprising 3×3 pixels of the same light colour. Adjacent graphic marker 122 represents a point above the MPR plane, and features a pair of dark pixels in the lower half of the 3×3 square. Finally, graphic marker 124 represents a point below the MPR plane, and features a pair of dark pixels in the upper half of the 3×3 square. The markers are shown on a blank dummy background for the purposes of illustration. FIG. 12(*b*) shows the same three markers again on a dummy background, with a surrounding dark border. This is used to improve visibility of the graphics against the background, which will typically be of varying dark and light hues. FIG. 12(*c*) shows the same markers, again on a dummy background, with line segments connecting the points to indicate the projected curve. The line segments are the same light colour as the graphics, and are also emphasised by a dark border. Finally, FIG. 12(*d*) shows the emphasised graphic markers and line segments against a typical varying background.

Any alternative patterns or designs may be used to indicate depth, although it is preferable that the patterns be simple, for ease of user recognition. Alternatively, different colours of graphic marker may be used to distinguish depth.

Defining the Curve

There are many suitable methods for defining the curve, using various techniques for placing and moving points on computer images. Various preferred features will now be described.

Points can be dropped on any of the MPR views by positioning the curve drawing tool with a mouse, and clicking the mouse button. Alternatively, the tool can be dragged along the desired path of the curve, and arranged such that a point is automatically dropped whenever the tool is detected to have moved a certain screen pixel distance from the previous dropped point.

The curve is automatically built up by connecting the points as they are dropped. To assist the user in this, a visual indicator can be used to highlight the point that the next dropped point will be connected to.

To provide greater flexibility and increase the accuracy of curve drawing, points can be dropped on any of the three standard MPR views, not just the one on which drawing began.

The curve drawing tool is preferably available at all times, including after the curve has been drawn. This permits the user to modify the curve by editing after completion. Hence corrections can be made, the curve can be extended, or the curve can be altered to shift the view for the purposes of comparison.

At any time, both during and after drawing, the curve drawing tool can be arranged for insertion of a new point into the curve, rather than adding points onto the end of the curve. The visual indicator described above can be used to highlight to which points in the curve the inserted point will be connected. To draw new points at either end of an existing curve, the user can move the tool close to the end point and begin dropping points as usual. The existing end point will automatically be highlighted as the insertion point. To insert new points into the middle of an existing curve, the user moves the cursor close to the two points he wishes to insert between and begins dropping one or more points as usual. The two points are automatically highlighted to show that the next point will be inserted between them.

To alter the shape of an existing curve, an existing point may be selected by clicking on or near to it with the curve drawing tool, and drag-repositioned to a new location, or deleted.

Each time a point on the curve is selected, the standard MPR views can be arranged to snap to that point, so that the origin, where the three planes intersect, is moved to the selected point. This is useful in assisting the user to visual the location in the three-dimensional volume of any particular point on the curve.

Picture Archiving and Communication Systems

The MPR systems according to the present invention will typically be used within a hospital environment. In this case, the system may usefully be integrated into a stand-alone software application, or with a Picture Archiving and Communication System (PACS). A PACS is a hospital-based computerised system which can store diagnostic images of different types (including three-dimensional volume data sets from computerised tomography (CT) and magnetic resonance imaging (MRI)) in a digital format organised in a single central archive. Each image has associated patient information such as the name and date of birth of the patient also stored in the archive. The archive is connected to a computer network provided with a number of workstations, so that users all around the hospital site can access and view any image data as needed. Additionally, users remote from the site may be permitted to access the archive over the Internet.

In the context of the present invention, therefore, a plurality of image volume data sets can be stored in a PACS archive, and a computer-implemented MPR system having an interface according to an embodiment of the invention can be provided on a workstation connected to the archive via a computer network. A user such as a surgeon, a consultant, or a researcher can thereby access any volume data set from the workstation, and generate MPR images using the interface.

Figure 13:
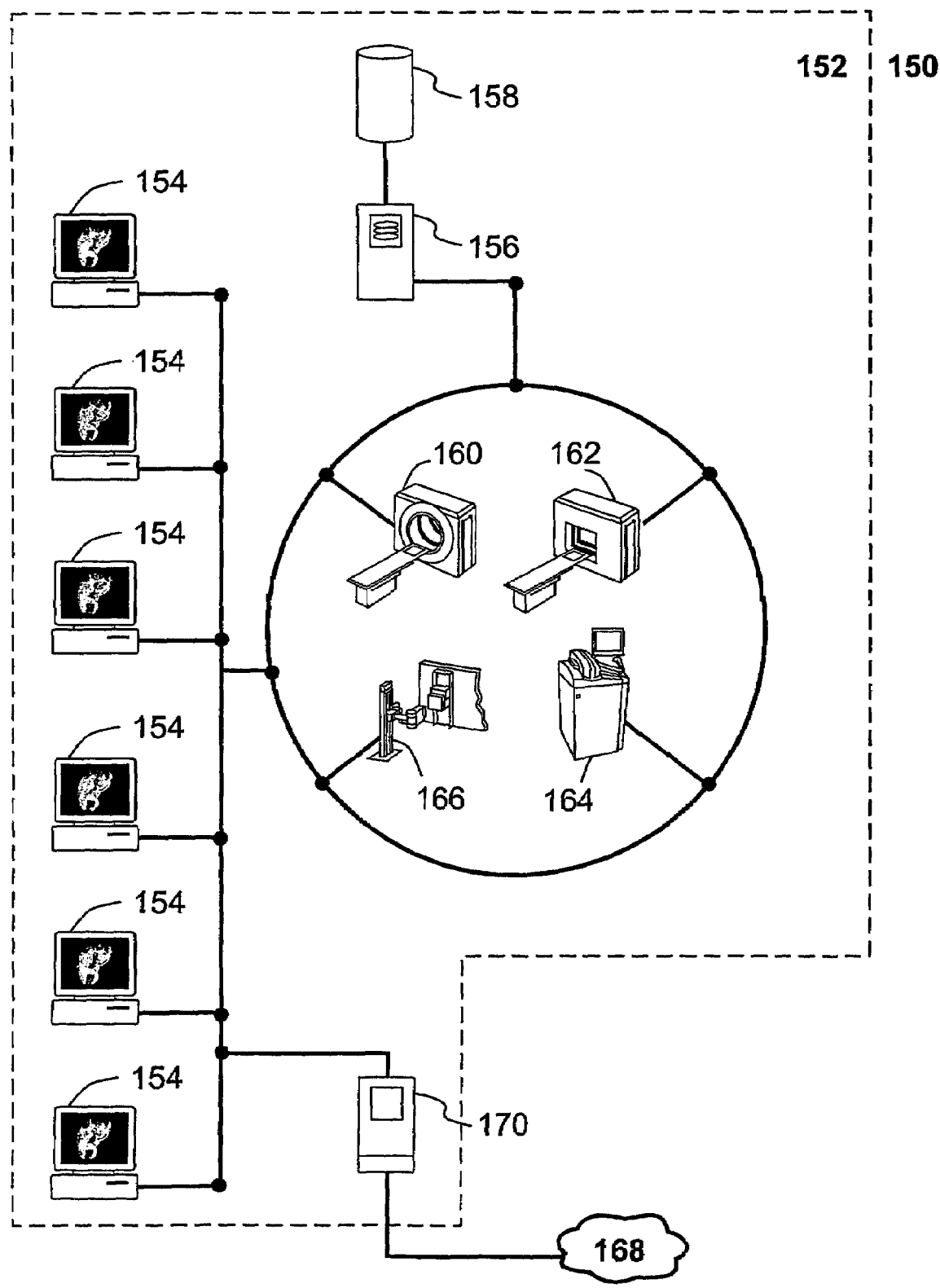
FIG. 13 shows a schematic diagram of an example computer network in which embodiments of the present invention may be used.

FIG. 13 shows an example computer network which can be used in conjunction with embodiments of the present invention. The network 150 comprises a local area network in a hospital 152. The hospital 152 is equipped with a number of workstations 154 which each have access, via the local area network, to a hospital computer server 156 having an associated storage device 158. A PACS archive is stored on the storage device 158 so that image data in the archive can be accessed from any of the workstations 154. One or more of the workstations 154 has access to software for computer-implementation of MPR using an interface as described hereinbefore. The software may be stored locally at the or each workstation 154, or may be stored remotely and downloaded over the network 150 to a workstation 154 when needed. Also, a number of medical imaging devices 160, 162, 164, 166 are connected to the hospital computer server 156. Image data collected with the devices 160, 162, 164, 166 can be stored directly into the PACS archive on the storage device 156. Thus a patient image can be accessed and viewed with MPR immediately after it is recorded, so that a swift diagnosis can be obtained in the event of medical emergency. The local area network is connected to the Internet 168 by a hospital Internet server 170, which allows remote access to the PACS archive. This is of use for remote accessing of the volume image data and for transferring data between hospitals, for example, if a patient is moved, or to allow external research to be undertaken.

REFERENCES

[1] A Vilanova, A König and E Gröller, "VirEn: A Virtual Endoscopy System", *Machine GRPAHICS & VISION*, 8, 469–487, 1999.
[2] U.S. Pat. No. 5,986,662
[3] "Vitrea 2 Using Manual", Vital Images, Plymouth, Minn., USA (copyright 2002)
[4] "Vitrea 2 Learning Manual", Vital Images, Plymouth, Minn., USA (copyright 2002)
[5] "Advantage Windows" system, GE Medical Systems, Waukesha, Wis., USA.
[6] A Kanistar et al, "CPR—Curved Planar Reformation", *IEEE Visualization* 2002 *Proceedings*, Boston, Oct. 27–Nov. 1, 2002.

The invention claimed is:

1. A user interface for a computer-implemented Multi-Planar Reformatting (MPR) system for allowing a user to define and view a curve through a three-dimensional volume data set, comprising:
first, second and third display areas in which are displayed three orthogonal MPR images of the volume data set;
a curve drawing tool to allow a user to define a curve through the volume data set, at least part of the curve being displayed in projected format on each of the MPR images;
a plurality of selectable icons each representing a direction substantially normal to a plane parallel to one of the MPR images, using which the user can select an approximate direction to be taken by the curve through the volume data set; and
a fourth display area, in which is displayed, after the user has defined at least part of the curve, a curve-related MPR image through the volume data set related to one or more positions along the curve.

2. A user interface according to claim 1, wherein the plurality of selectable icons are displayed in the fourth display area before the user begins to define the curve, and removed from the fourth display area and replaced with the curve-related MPR image after the user has defined at least part of the curve.

3. A user interface according to claim 1, wherein each icon comprises an image representing one of the orthogonal MPR images overlain with a generic indicator of a direction to be taken by the curve which is substantially orthogonal to one of the other two orthogonal MPR images.

4. A user interface according to claim 3, wherein the generic indicator comprises a curved line and a representation of curvature of the orthogonal MPR image.

5. A user interface according to claim 3, wherein the image comprised in each icon is a thumbnail version of the relevant orthogonal MPR image.

6. A user interface according to claim 3, wherein the image comprised in each icon is a generic representation of the relevant orthogonal MPR image.

7. A user interface according to claim 6, wherein the generic representation of the relevant orthogonal MPR image is selected from a group of generic representations according to user input or tags associated with the three-dimensional volume data set.

8. A user interface according to claim 1, wherein the plurality of selectable icons comprises six icons each representing one of six possible combinations of a plane parallel to one of the orthogonal MPR images and a direction substantially normal to a plane parallel to one of the other two MPR images, the six icons being individually selectable to allow the user to select both a direction to be taken by the curve, and a plane parallel to one of the MPR images.

9. A user interface according to claim 8, wherein the curve-related MPR image shown in the fourth display area is a curved MPR image having a view direction substantially normal to the selected plane.

10. A user interface according to claim 1, wherein the plurality of selectable icons comprises six icons each representing one of six possible combinations of a plane parallel to one of the orthogonal MPR images and a direction substantially normal to a plane parallel to one of the other two MPR images, the six icons being grouped in selectable pairs, each pair having a common direction to be taken by the curve, to allow the user to select a direction to be taken by the curve.

11. A user interface according to claim 10, wherein the curve-related MPR image shown in the fourth display area is a cross-curve MPR image showing an image perpendicular to the curve at a selected position.

12. A user interface according to claim 10, wherein after the curve has been defined, the selected pair of icons can be redisplayed in the fourth display area as individually selectable icons to allow the user to select a plane parallel to one of the MPR images, and after selection the fourth display area shows a curved MPR image having a view direction substantially normal to the selected plane.

13. A user interface according to claim 1, wherein the plurality of selectable icons comprises three icons each representing one of three directions, each direction being substantially normal to a plane parallel to one of the MPR images, the three icons being individually selectable to allow the user to select a direction to be taken by the curve.

14. A user interface according to claim 13, wherein the curve-related MPR image shown in the fourth display area is a cross-curve MPR image showing an image perpendicular to the curve at a selected position.

15. A user interface according to claim 13, wherein after the curve has been defined, two icons can be displayed in the fourth display area, each icon representing one of the two planes parallel one of the orthogonal MPR images and orthogonal to the plane normal to the selected direction, the icons being individually selectable to allow the user to select a plane parallel to one of the MPR images, and after selection the fourth display area shows a curved MPR image having a view direction substantially normal to the selected plane.

16. A user interface according to claim 9, wherein the orthogonal MPR image which is substantially normal to the selected direction of the curve further shows a manipulatable tool which can be manipulated by the user to control rotation of the view direction about the curve.

17. A user interface according to claim 16, wherein the manipulatable tool comprises one or more arcs along which the view direction can be moved.

18. A user interface according to claim 17, wherein the manipulatable tool further comprises one or more lines or arrows indicating the current view direction.

19. A user interface according to claim 16, wherein rotation of the view direction causes the curved MPR image displayed in the fourth display area to be updated such that the curved MPR image is orientated according to a clinical standard.

20. A user interface according to claim 1, wherein the two orthogonal MPR images which are substantially parallel to the selected direction of the curve show all of the curve in projected format.

21. A user interface according to claim 1, wherein the orthogonal MPR image which is substantially normal to the selected direction of the curve shows a part of the curve in projected format, comprising portions of the curve lying within a predetermined thickness of the volume data set.

22. A user interface according to claim 1, wherein the projected format of the curves comprises a plurality of graphic markers marking points along the curve, and line segments connecting the graphic markers of adjacent points.

23. A user interface according to claim 22, wherein the graphic markers have different designs to indicate the distance through the volume data set of the points from the plane of the orthogonal MPR image.

24. A user interface according to claim 22, wherein the graphic markers are movable and deletable to allow the user to redefine the curve.

25. A computer program product carrying machine-readable instructions for implementing a Multi-Planar Reformatting (MPR) system, the system having a user interface according to claim 1.

26. A computer system comprising:
 a Picture Archiving and Communication System having memory for storing three-dimensional volume data sets;
 image processing software operable to perform Multi-Planar Reformatting image processing on the volume data sets and having a user interface according to claim 1; and
 one or more workstations operable to access the memory and retrieve the three-dimensional volume data sets, and implement the image processing software.

27. A method of presenting a computer-implemented Multi-Planar Reformatting (MPR) system to a user, the system operable to allow a user to define and view a curve through a three-dimensional volume data set, the method comprising:
 displaying three orthogonal MPR images of the volume data set in first, second and third display areas;
 displaying a plurality of selectable icons each representing a direction substantially normal to a plane parallel to one of the MPR images;
 allowing a user to select an approximate direction to be taken by the curve through the volume data set by selecting one or more of the icons;
 allowing a user to define a curve through the volume data set;
 displaying at least part of the curve in projected format on each of the MPR images;
 deriving a curve-related MPR image through the volume data set related to one or more positions along the curve; and
 displaying the curve-related MPR image in the fourth display area.

28. A method according to claim 27, wherein the plurality of selectable icons are displayed in the fourth display area, and removed from the fourth display area before the curve-related MPR image is displayed.

29. A method according to claim 27, wherein each icon comprises an image representing one of the orthogonal MPR images overlain with a generic indicator of a direction to be taken by the curve which is substantially orthogonal to one of the other two orthogonal MPR images.

30. A method according to claim 29, wherein the generic indicator comprises a curved line and a representation of curvature of the orthogonal MPR image.

31. A method according to claim 29, wherein the image comprised in each icon is a thumbnail version of the relevant orthogonal MPR image.

32. A method according to claim 29, wherein the image comprised in each icon is a generic representation of the relevant orthogonal MPR image.

33. A method according to claim 32, wherein the generic representation of the relevant orthogonal MPR image is selected from a group of generic representations according to user input or tags associated with the three-dimensional data set.

34. A method according to claim 27, wherein the plurality of selectable icons comprises six icons each representing one of six possible combinations of a plane parallel to one of the orthogonal MPR images and a direction substantially normal to a plane parallel to one of the other two MPR images, the six icons being individually selectable to allow the user to select both a direction to be taken by the curve, and a plane parallel to one of the MPR images.

35. A method according to claim 34, wherein the curve-related MPR image is a curved MPR image having a view direction substantially normal to the selected plane.

36. A method according to claim 27, wherein the plurality of selectable icons comprises six icons each representing one of six possible combinations of a plane parallel to one of the orthogonal MPR images and a direction substantially normal to a plane parallel to one of the other two MPR images, the six icons being grouped in selectable pairs, each pair having a common direction, to allow the user to select a direction to be taken by the curve.

37. A method according to claim 36, wherein the curve-related MPR image is a cross-curve MPR image showing an image perpendicular to the curve at a selected position.

38. A method according to claim 36, and further comprising:

removing the curve-related MPR image from the fourth display area;

redisplaying the selected pair of icons in the fourth display as individually selectable icons;

allowing the user to select a plane parallel to one of the orthogonal MPR images by selecting one of the icons;

deriving a curved MPR image through the volume data set having a view direction substantially normal to the selected plane;

removing the icons from the fourth display area; and displaying the curved MPR image in the fourth display area.

39. A method according to claim 27, wherein the plurality of selectable icons comprises three icons each representing one of three directions, each direction being substantially normal to a plane parallel to one of the MPR planes, the three icons being individually selectable to allow the user to select a direction to be taken by the curve.

40. A method according to claim 39, wherein the curve-related MPR image is a cross-curve MPR image showing an image perpendicular to the curve at a selected position.

41. A method according to claim 39, and further comprising:

removing the curve-related MPR image from the fourth display area;

displaying in the fourth display area two individually selectable icons, each icon representing one of the two planes parallel one of the orthogonal MPR images and orthogonal to the plane normal to the selected direction;

allowing the user to select a plane parallel to one of the orthogonal MPR images by selecting one of the icons;

deriving a curved MPR image through the volume data set having a view direction substantially normal to the selected plane;

removing the icons from the fourth display area; and displaying the curved MPR image in the fourth display area.

42. A method according to claim 35, and further comprising:

displaying on the orthogonal MPR image which is substantially normal to the selected direction of the curve a manipulatable tool for controlling rotation of the view direction;

allowing the user to manipulate the tool to rotate the view direction;

re-deriving the curved MPR image in accordance with the rotated view direction; and displaying the re-derived curved MPR image in the fourth display area.

43. A method according to claim 42, wherein the manipulatable tool comprises one or more arcs along which the view direction can be moved.

44. A method according to claim 43, wherein the manipulatable tool further comprises one or more lines or arrows indicating the current view direction.

45. A method according to claim 42, wherein the re-derived curved MPR image is displayed such that it is orientated according to a clinical standard.

46. A method according to claim 27, wherein all of the curve is displayed in projected format on the two orthogonal MPR images which are substantially parallel to the selected direction of the curve.

47. A method according to claim 27, wherein part of the curve comprising portions of the curve lying within a predetermined thickness of the volume data set is displayed in projected format on the orthogonal MPR image which is substantially normal to the selected direction of the curve.

48. A method according to claim 27, wherein the projected format of the curves comprises a plurality of graphic markers marking points along the curve, and line segments connecting the graphic markers of adjacent points.

49. A method according to claim 48, wherein the graphic markers have different designs to indicate the distance through the volume data set of the points from the plane of the orthogonal MPR image.

50. A method according to claim 48, wherein the graphic markers are movable and deletable to allow the user to redefine the curve.

* * * * *